US008790546B2

(12) United States Patent
Schmidt et al.

(10) Patent No.: US 8,790,546 B2
(45) Date of Patent: Jul. 29, 2014

(54) SOLID FUEL VOLATILIZATION TO PRODUCE SYNTHESIS GAS

(75) Inventors: Lanny D. Schmidt, Minneapolis, MN (US); Paul J. Dauenhauer, Wisconsin Rapids, WI (US); Nick J. Degenstein, The Woodlands, TX (US); Bradon J. Dreyer, Rockford, MI (US); Joshua L. Colby, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 1338 days.

(21) Appl. No.: 12/528,416

(22) PCT Filed: Mar. 5, 2008

(86) PCT No.: PCT/US2008/002992
§ 371 (c)(1),
(2), (4) Date: Jan. 13, 2010

(87) PCT Pub. No.: WO2008/109129
PCT Pub. Date: Sep. 12, 2008

(65) Prior Publication Data
US 2010/0200810 A1 Aug. 12, 2010

(51) Int. Cl.
*C10J 3/02* (2006.01)
*C01B 3/04* (2006.01)
*C01B 3/02* (2006.01)

(52) U.S. Cl.
USPC ........................................ 252/373; 48/197 R

(58) Field of Classification Search
USPC .......... 423/418.2, 437.1, 648.1, 651; 252/373
See application file for complete search history.

(56) References Cited

U.S. PATENT DOCUMENTS

| 3,890,432 A | 6/1975 | White |
| 5,105,052 A | 4/1992 | Font Freide et al. |
| 5,374,339 A | 12/1994 | Guillet et al. |
| 5,658,497 A | 8/1997 | Kumar et al. |
| 5,663,473 A | 9/1997 | Griffiths et al. |

(Continued)

FOREIGN PATENT DOCUMENTS

| CA | 2083601 | 11/1991 |
| DE | 40 38 897 A1 | 6/1992 |

(Continued)

OTHER PUBLICATIONS

Asadullah et al. "A novel catalytic process for cellulose gasification to synthesis gas" Catgalysis Communicatinos 2 (2001) 63-68.*

(Continued)

*Primary Examiner* — Wayne Langel
*Assistant Examiner* — Syed Iqbal
(74) *Attorney, Agent, or Firm* — Schwegman Lundberg & Woessner, P.A.

(57) ABSTRACT

A method comprising contacting a carbon and hydrogen-containing solid fuel and a metal-based catalyst in the presence of oxygen to produce hydrogen gas and carbon monoxide gas, wherein the contacting occurs at a temperature sufficiently high to prevent char formation in an amount capable of stopping production of the hydrogen gas and the carbon monoxide gas is provided. In one embodiment, the metal-based catalyst comprises a rhodium-cerium catalyst. Embodiments further include a system for producing syngas. The systems and methods described herein provide shorter residence time and high selectivity for hydrogen and carbon monoxide.

19 Claims, 8 Drawing Sheets

(56) References Cited

U.S. PATENT DOCUMENTS

| | | | |
|---|---|---|---|
| 6,190,623 | B1 | 2/2001 | Sanger et al. |
| 6,433,234 | B1 | 8/2002 | Griffiths et al. |
| 7,863,341 | B2 * | 1/2011 | Routier .................... 518/702 |
| 8,349,289 | B2 | 1/2013 | Schmidt et al. |
| 2003/0115800 | A1 | 6/2003 | Yamada et al. |
| 2004/0199038 | A1 | 10/2004 | Schmidt et al. |
| 2005/0176580 | A1 | 8/2005 | Osaka et al. |
| 2005/0260123 | A1 | 11/2005 | Deluga et al. |
| 2006/0032139 | A1 | 2/2006 | Yamada et al. |
| 2006/0090397 | A1 | 5/2006 | Edlund et al. |
| 2007/0004809 | A1 * | 1/2007 | Lattner et al. ............ 518/700 |
| 2008/0014539 | A1 | 1/2008 | Pisklak et al. |
| 2008/0237542 | A1 | 10/2008 | Schmidt et al. |

FOREIGN PATENT DOCUMENTS

| | | |
|---|---|---|
| EP | 0531371 B1 | 3/1993 |
| JP | 06-131691 | 5/1994 |
| JP | 2002346388 | 12/2002 |
| KR | 1020020015053 | 2/2002 |
| KR | 1020050008676 | 1/2005 |
| WO | WO-2008109129 A2 | 9/2008 |
| WO | WO-2008109129 A3 | 9/2008 |

OTHER PUBLICATIONS

Asadullah et al. "Novel biomass gadification method with high efficiency: catalytic gasification at low temperature" The Royal Society of Chemistry 2002. p. 385-389.*

Salge et al. "Renewable Hydrogen from Nonvolatile Fuels by Reactive Flash Volatilization" Science vol. 314 Nov. 2006, p. 801-804.*

"U.S. Appl. No. 12/043,030, Non Final Office Action mailed Apr. 4, 2011", 16 pgs.

"U.S. Appl. No. 12/043,030, Response flied Aug. 2, 2011 to Non Final Office Action mailed Apr. 4, 2011", 14 pgs.

"International Application Serial No. PCT/US2008/002992, Written Opinion mailed Aug. 29, 2008", 6 pgs.

"International Application Serial No. PCT/US2008/002992, Search Report mailed Aug. 29, 2008".

Asadullah, M., et al., "A Novel Catalytic Process for Cellulose Gasification to Synthesis Gas", *Catalysis Communications*, 2(2), (2001), 63-68.

Asadullah, M., et al., "Biomass Gasification to Hydrogen and Syngas at Low Temperature: Novel Catalytic System Using Fluidized-Bed Reactor", *Journal of Catalysis*, 208, (2002), 255-259.

Asadullah, M., et al., "Catalytic Performance of Rh/CeO2 in the Gasification of Cellulose to Synthesis Gas at Low Temperature", *Industrial & Engineering Chemistry Research*, 40, (2001), 5894-5900.

Asadullah, M., et al., "Novel Biomass Gasification Method With High Efficiency: Catalytic Gasification at Low Temperature", *Green Chemistry*, 4, (2002), 385-389.

Boutin, O., et al., "Flash Pryolysis of Cellulose Pellets Submitted to a Concentrated Radiation: Experiments and Modelling", *Chemical Engineering Science*, 57(1), (2002), 15-25.

Bridgwater, A. V., "Renewable Fuels and Chemicals by Thermal Processing of Biomass", *Chemical Engineering Journal*, 91, (2003), 87-102.

Garcia, L., et al., "Catalytic Steam Reforming of Bio-Oils for the Production of Hydrogen: Effects of Catalyst Composition", *Applied Catalysis A: General 201*, (2000), 225-239.

Salge, J. R., et al., "Renewable Hydrogen From Nonvolatile Fuels by Reactive Flash Volatilization", *Science*, 314, (2006), 801-804.

"U.S. Appl. No. 12/043,030 Non-Final Office Action Response", 13 pgs.

"U.S. Appl. No. 12/043,030, Final Office Action mailed Apr. 12, 2012", 10 pgs.

"U.S. Appl. No. 12/043,030, Non Final Office Action mailed Oct. 26, 2011", 10 pgs.

"U.S. Appl. No. 12/043,030, Notice of Allowance mailed Sep. 6, 2012", 7 pgs.

"U.S. Appl. No. 12/043,030, Response filed Jul. 2, 2012 to Final Office Action mailed Apr. 12, 2012", 7 pgs.

* cited by examiner

SOLID FUEL VOLATILIZATION TO PRODUCE SYNTHESIS GAS

GOVERNMENT SUPPORT

This invention was made with government support under Grant Number DE-FG02-88ER13878 from the U.S. Department of Energy. The United States Government has certain rights in the invention.

CROSS-REFERENCE TO RELATED APPLICATIONS

This application claims priority under 35 U.S.C. §119(e) to U.S. Provisional Patent Application No. 60/893,080, filed Mar. 5, 2007, which is incorporated herein by reference in its entirety.

BACKGROUND

Dependence on petroleum and continued carbon emissions have led to a focus on methods of utilizing a large supply of biomass, such as non-fossilized biomass in the form of grasses, trees, and agricultural residue as alternative energy sources [1]. However, biomass, including fossilized biomass (e.g., petroleum), presents a significant processing challenge, because it is a complex mixture of biopolymers of low energy density dispersed across the countryside. Biomass is typically used to produce synthesis gas (syngas), which, in turn, is used to produce synthetic fuels. Current methods to process biomass, such as fast pyrolysis or gasification, are complicated, slow, and require significant transportation to the processing location [2, 3].

Direct thermochemical conversion of biomass to a single clean stream of syngas is an attractive route for producing syngas without significant pre-processing of the biomass required. However, this process lacks an effective catalytic method that is easily scalable and sufficiently simple for coupling to standard reforming practices. Syngas can easily be converted into diesel fuel through the Fischer Tropsch process or to methanol or dimethyl ether, allowing high efficiency end use in modern diesel engines without significant changes in the current transportation infrastructure [4]. While the thermochemical route to syngas benefits from its ability to convert a solid mixture of biopolymers, Accordingly, there is a need for improved methods to produce syngas.

SUMMARY

A method comprising contacting a carbon and hydrogen-containing solid fuel and a metal-based catalyst in the presence of oxygen to produce hydrogen gas and carbon monoxide gas, wherein the contacting occurs at a temperature sufficiently high to prevent char formation in an amount capable of stopping production of the hydrogen gas and the carbon monoxide gas is provided. In one embodiment, the metal-based catalyst comprises a transition metal or a noble metal. In one embodiment, the metal-based catalyst contains a transition metal or noble metal in combination with a lanthanide. The transition metal or noble metal may be selected from the group consisting of Ni, Pd, Pt, Co, Rh, Ir, Fe, Ru, Os, Cu, Ag, Au, Re and combinations thereof while the lanthanide may be cerium or lanthanum. In a particular embodiment, the metal-based catalyst is a rhodium-cerium catalyst.

Any suitable type of biomass (i.e., biofuel) containing carbon and hydrogen may be used in the present invention. In one embodiment, the biomass is non-fossilized biomass such as plant biomass, municipal waste biomass or animal biomass. The plant biomass includes, but is not limited to, cotton, trees, grasses, cassava plant starch, and combinations thereof. In one embodiment, the biomass is fossilized biomass such as plastic, with or without added plasticizers.

The catalyst can be preheated by any suitable means. In one embodiment, methane gas is added to the reactor system to preheat the catalyst. In one embodiment, the catalyst has a surface temperature and the fuel is contacted with a surface of the metal-based catalyst at a rate sufficient to maintain the surface temperature of the catalyst between about 500° C. and about 1600° C. In one embodiment, the temperature is at least about 400° C.

Any suitable reactant gases can be used. In one embodiment the reactant gases include oxygen. In another embodiment, the reactant gases include oxygen and nitrogen. In one embodiment, the carbon and oxygen are present in a ratio of between about 0.3 and 2.5.

The methods described herein have high selectivities to hydrogen and carbon monoxide. In one embodiment the selectivity may be as high as 99%.

Any suitable reactor may be used for the rapid volatilization method described herein. In most instances, such reactors will be much smaller than conventional methods. In one embodiment, total residence time of the hydrogen gas and the carbon monoxide gas is less than about 500 milliseconds. In one embodiment, total residence time of the hydrogen gas and the carbon monoxide gas is less than about 80 milliseconds.

In another embodiment, a method for producing synthesis gas in a reactor comprising inputting carbohydrate-based solid fuel particles containing carbon into the reactor at about room temperature, wherein the reactor contains a metal-lanthanide catalyst; inputting nitrogen and oxygen into the solid fuel source and the reactor at about room temperature, wherein carbon and oxygen are input in a ratio of between about 0.3 to about 2.5; and allowing the particles to contact a front surface of the catalyst wherein synthesis gas is produced at a total gas residence time of less than about 500 milliseconds without an external heating system is provided. Such a method may further use any suitable type of pre-heating method, such as added methane. In one embodiment, methane gas is input for less than about five (5) minutes to heat the catalyst prior to inputting the particles. In one embodiment, the carbohydrate-based solid fuel includes, but is not limited to, starch, cellulose, hemicellulose, lignin and combinations thereof. In one embodiment, the particles are about 0.1 to about one (1) mm in diameter, although it is to be understood that particles much larger, including particle agglomerations and whole or partially chopped or processed biomass may be used.

Embodiments of the invention further comprise a system for producing synthesis gas comprising a reactor containing a metal-based catalyst on a support; means for heating the metal-based catalyst; and means for inputting solid biomass, nitrogen and oxygen into the reactor at a carbon to oxygen ratio of between about 0.3 and 2.5 wherein the solid biomass contacts a surface of the metal-based catalyst to produce synthesis gas. In one embodiment, the means for inputting the solid biomass is a screw extruder. In one embodiment, the means for heating the metal-based catalyst comprises inputting methane gas. Any suitable catalyst support may be used for the methods described herein. In one embodiment, the catalyst support is ceramic foam or alumina oxide spheres.

Embodiments of the present invention provide a unique catalytic method to convert nonvolatile biomass to synthesis gas (syngas) without an external heat source and at least an order of magnitude faster than existing systems. Solid biomass directly contacting a hot catalytic surface maintained by heat conduction from partial oxidation undergo rapid decomposition to a clean synthesis gas stream at millisecond times with minimal or no char formation. High selectivity to synthesis gas can be obtained from biomass, such as cellulose, starch, lignin and polyethylene, potentially permitting production of synthetic fuels from solid biomass in small and simple processes.

DETAILED DESCRIPTION

Figure 1:
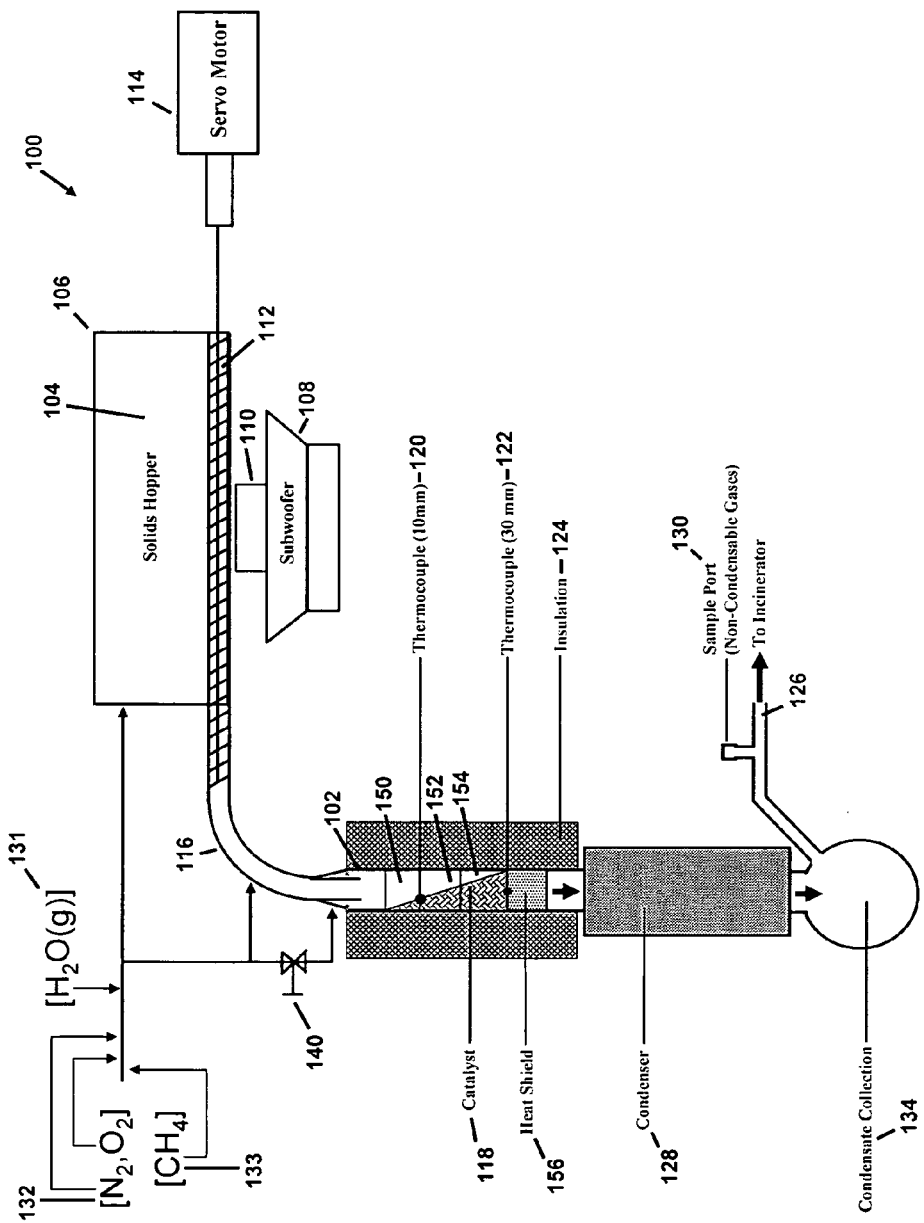
FIG. 1 illustrates a reactor system in accordance with an embodiment of the invention, wherein component 131 represents optional steam addition of one embodiment.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that variations may be employed. It is also to be understood that numerous changes may be made without departing from the spirit and scope of the invention. The following description is, therefore, not to be taken in a limiting sense, and the scope of the invention is defined by the appended claims and their equivalents.

Embodiments of the present invention provide a system and method of solid biomass conversion to syngas. Other benefits can also be realized which will become apparent herein.

As used herein, certain terms have the following meanings. All other terms and phrases used in this specification have their ordinary meanings as one of skill would understand. Such ordinary meanings may be obtained by reference to technical dictionaries, such as *Hawley's Condensed Chemical Dictionary* 11$^{th}$ Edition, by Sax and Lewis, Van Nostrand Reinhold, New York, N.Y., 1987, and *The Merck Index,* 11$^{th}$ Edition, Merck & Co., Rahway N.J. 1989.

DEFINITIONS

The term "and/or" means any one of the items, any combination of the items, or all of the items with which this term is associated.

The singular forms "a," "an," and "the" include plural reference unless the context clearly dictates otherwise. Thus, for example, a reference to "a formulation" includes a plurality of such formulations, so that a formulation of compound X includes formulations of compound X.

The term "about" means a variation of 10 percent of the value specified, for example, about 50 percent carries a variation from 45 to 55 percent. For integer ranges, the term about can include one or two integers greater than and less than a recited integer.

The term "ash" as used herein refers to inorganic minerals remaining after thermal conversion of a fuel. The inorganic material can, for example, include calcium, magnesium, potassium, and various compounds and salts thereof, such as those that include carbonate, halide, or hydroxide cations.

The term "biomass" or "biomass fuel" is intended herein to refer to any organic matter collected for use as a source of energy. Various types of non-fossilized biomass include plant biomass (defined below), animal biomass (any animal by-product, animal waste, etc.) and municipal waste biomass (residential and light commercial refuse with recyclables such as metal and glass removed). Biomass is further considered herein to include any type of carbonaceous material from a fossilized source. Fossilized biomass, therefore, can further encompass various petroleum products, including, but not limited to plastic and plasticizers (defined below). Animal biomass can refer to any material generated by animals. Animal biomass includes, for example, animal tissue and animal excrement.

The term "char" refers to a solid material rich in carbon, hydrogen, and oxygen, which results from the thermal conversion of a solid fuel. Char may further contain ash if the solid fuel contained ash." Those skilled in the art often use the term "carbon", "coke" or "carbon formation" interchangeably with the term "char" and such an interpretation is intended herein.

The term "plant biomass" or "ligno-cellulosic biomass" as used herein is intended to refer to virtually any plant-derived organic matter (woody or non-woody) available for energy on a sustainable basis. "Plant-derived" necessarily includes both sexually reproductive plant parts involved in the production of seed (e.g., flower buds, flowers, fruit and seeds) and vegetative parts (e.g., leaves, roots, leaf buds and stems). Examples of such plants include, but are not limited to, corn, soybeans, cotton, wheat, rice, algae, and the like. Plant biomass can include, but is not limited to, agricultural crop wastes and residues such as corn stover, wheat straw, rice straw, sugar cane bagasse and the like. Plant biomass further includes, but is not limited to, woody energy crops, wood wastes and residues such as trees, softwood forest thinnings, barky wastes, sawdust, paper and pulp industry waste streams, wood fiber, and the like. Examples of such trees, include, but are not limited to, hybrid poplar trees (e.g., Aspen), and the like. Additionally any type of grasses, such as switch grass and the like, have potential to be produced large-scale as another plant biomass source. For urban areas, plant biomass feedstock may comprise yard waste (e.g., grass clippings, leaves, tree clippings, brush, etc.) and vegetable processing waste. Plant biomass is known to be the most prevalent form of carbohydrate available in nature.

The term "metal catalyst" refers to a catalyst that contains one metal, metal-containing compound, or metal-containing composite. In various embodiments, the metal catalyst can optionally include a second metal, metal-containing compound, or metal-containing composite. The term "mixed-metal catalyst" refers to a catalyst that contains more than one metal, metal-containing compound, or metal-containing composite. The metal catalyst may be supported on another material such as a ceramic-like alumina, zirconia, or ceria support, or a metal support. The presence of a catalyst support is found with the catalyst in any embodiment that requires a catalyst support, as would be readily recognized by those skilled in the art.

The term "plastic" as used herein includes any type of "thermoplastic polymer" (i.e., "thermosoftening plastic" or "thermoplastic") which is a non-crosslinked plastic that can be repeatedly softened upon heating and hardened upon cooling. Examples include, but are not limited to addition polymers such as polypropylene, polyethylene, polystyrene and polyvinyl chloride (PVC). Other examples further include condensation polymers such as polyesters, polyamides (nylon) and polyethylene terephthalate (pop bottles). "Plastic" is further considered herein to include a "thermosetting plastic" (i.e., "thermoset resin") which is a cross-linked plastic that can be formed into a shape during manufacture, but which sets permanently rigid, i.e., fully cures, during heating. "Plastic" is further considered herein to include "thermoplastic elastomer" (i.e., "elastomer"), which is a cross-linked plastic that can be formed into a shape during manufacture, but has "rubber-like" properties which allow it to stretch and return to its original shape even after it is set. A "plastic" is further considered to include any monomer, monomers, co-polymer or co-polymers that make up any of the aforementioned materials.

The term "plasticizer" as used herein refers to an additive for plastic materials. Plasticizers are often based on esters of polycarboxylic acids with linear or branched aliphatic alcohols of moderate chain length. Plasticizers work by embedding themselves between polymer chains, thus spacing them apart, i.e., increasing "free volume" and thus significantly lowering the glass transition temperature for the plastic and making it softer. Plasticizers include, but are not limited to, bis(2-ethylhexyl) phthalate (DEHP), adipate-based plasticizers such as bis(2-ethylhexyl)adipate (DOA) and trimellitates.

The term "residence time" as used herein refers to the average time spent in a reactor by syngas. Residence time is determined by dividing the void space volume of the reactor support by the rate of volumetric flow therethrough at the effluent temperature and molar flow rate.

The term "synthesis gas" or "syngas" as used herein refers to a mixture of hydrogen and carbon monoxide. Syngas is an intermediate for the production of synthetic fuels (e.g., natural gas, diesel, gasoline, dimethyl ether and the like) and gasoline), chemicals (e.g., alkanes, methanol, and the like) and fertilizers (e.g., ammonia). Syngas is also useful as a source of energy in gas engines, gas turbines, fuel cells, and the like. Syngas may also include, for example, other materials such as water, carbon dioxide, and methane.

Solid Biomass Conversion to Syngas

The challenge with direct catalytic conversion of solid biomass to syngas is to avoid formation of solid char at a level that can cover catalyst surface sites and block the surface mechanism. Slow heating of biomass such as cellulose, $(C_6H_{10}O_5)_n$, at low temperatures can result in a significant fraction converting to solid char similar to charcoal production from wood.

Global homogeneous models such as the Shafizadeh model describing this conversion predict significantly less char production above 400° C. with most of the biomass being converted to volatile organic compounds (VOC) at 500° C. in about a second [5,6],

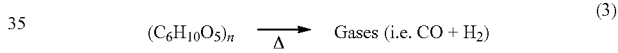

At even higher temperatures, conversion occurs much faster with higher selectivity to gases and little or no selectivity to char. [7]

Biomass can currently be converted at moderate yields to synthesis gas in several different types of gasifiers that oxidize and pyrolyze biomass particles in large systems.

DESCRIPTION OF EMBODIMENTS

Embodiments described herein provide for direct conversion to synthesis gas (syngas) of solid organic materials, i.e., solid biomass, in the presence of a suitable catalyst, without carbon formation (char) in an amount sufficient to stop the reaction. In one embodiment, there are only trace amounts of char. In one embodiment, there is no char. The reactor system can be of any suitable design as long as it can perform the intended function. An exemplary reactor system is shown in FIG. 1 and described in detail in Example 1.

The reactor system includes a reactor portion of any suitable size and shape. Reactors useful in embodiments of the present invention are much smaller than conventional reactors because the residence time is much smaller than in a conventional reactor. This is primarily due to the high operating temperatures, such that the chemistry, i.e., the reaction, occurs in milliseconds versus seconds. Additionally, conventional gasifiers typically have a circulating bed in order to continuously move components (e.g., sand particles, solids, etc) which are essentially burned to produce gas. In contrast, embodiments of the present invention provide for a stationary catalyst for producing syngas.

In one embodiment, the reactor is about two (2) centimeters in diameter with a catalyst approximately three (3) cm in length. Smaller reactors are possible having a reactor diameter of greater than about 0.1 millimeter and may be viable for small scale syngas production. A reactor diameter of about 0.1 millimeter is seen as the lower limit of the reactor size as otherwise it may be difficult to consistently administer solid particles to the reactor. In another embodiment, the reactor diameter may have a diameter of up to about five (5) meters. A larger reactor would be able to handle much larger biomass particles because of the larger the reactor tube size. Such reactors may be able to handle biomass particles up to about one (1) meter in diameter. A reactor tube larger than about five (5) meters in diameter, however, would likely consume an extremely large amount of biomass fuel and therefore be uneconomical from the standpoint of fuel transportation to the plant.

In one embodiment, multiple small fuel processing reactors are distributed across the countryside. Possible reactor configurations capable of processing solid fuel as described herein include any type of device that can contain a catalyst and catalyst support together with reactant gases at operating temperatures of at least about 400° C. and allow the final product to exit for use in various applications. The reactor can be of any suitable overall size. In one embodiment, the reactor includes a condenser and condensate collection device as shown in FIG. 11n one embodiment, insulation is used as shown in FIG. 1. Temperature measurement devices, such as thermocouples, may optionally also be used in any location as desired.

The reactor may further use any suitable type of catalyst support. Such supports may include, but are not limited to, ceramic or metal foams, extruded ceramic supports, metal gauses, ceramic gauses, spheres, channels or any combination of these that can be impregnated with a metal-based catalyst and maintain physical contact with solid fuel and feed gases. In one embodiment, the catalyst and/or the catalyst support are continually removed and/or replaced during continuous or batch operation. Any suitable type of reactor tubing can be used that is capable of performing the intended function. The reactor tubing may be made from a variety of materials, including, but not limited to, any metal or ceramic capable of separating the reactant gases, solids, and liquids from the external environment. In one embodiment, the catalyst and/or catalyst support are not held in place by the reactor tubing.

Solid fuel can be delivered to the reactor by any device capable of controlled metering, including, but not limited to a vibratory feeder, a mechanical auger, or any gas blown system that fluidizes solid particles. In one embodiment, such devices may optionally include vibration systems that vibrate the solid feed system to maintain solid particle delivery.

Reactant gases necessarily include oxygen ($O_2$) at a molar percentage greater than zero percent and as high as approximately 100%. The remaining fraction may contain, but is not limited to, $N_2$, $H_2O$, $CH_4$ or any other alkane and/or any non-reactive diluent, such as He or Ar.

The reactor is started up by any suitable method which causes the catalyst to be heated to a temperature sufficient to allow the desired reaction to occur within the reactor. In one embodiment, the catalyst is pre-heated to about 400° C., although the invention is not so limited. In other embodiments, the catalyst is pre-heated to and maintained (via the reaction process) at temperatures up to about 1300° C. In one embodiment, the catalyst is at 1600° C. However, in most embodiments, the temperature does not go above about 1300° C. to avoid damage to the catalyst and volatilization of the catalytic metal which may lead to catalyst loss and deactivation. In one embodiment, methane gas is added as a start-up gas together with the reactant gases, such that methane oxidation is used to heat the reactor.

The solid organic materials useful herein likely include any solid containing carbon and hydrogen, since the hot catalyst surface pyrolyzes the solid at the interface into products that are easily reformed. The solid may further include any element on the periodic table in combination with hydrogen and carbon elements. The solid particles can further contain varying levels of moisture. Likely, moisture within feedstocks may improve hydrogen yield and further suppress carbon formation. Most biomass sources contain ash, as defined herein, which may be at levels as high as about 20%. The ash may contain any number of impurities, including, but not limited to, Ca, Mg, K, Si, S, Cl, N, Ph, Al, B, Na, Li, I, Pb, and Fe, or any other compound containing these impurities such as CaO, MgO, $CaCO_3$, and the like. The presence of ash does not appear to be detrimental to the operation of the catalyst. In one embodiment, Aspen wood is used, which contains approximately 0.5 wt % ash.

In one embodiment, plant biomass is used as the solid fuel. Nearly all forms of ligno-cellulosic biomass, i.e., plant biomass, comprise three primary chemical fractions: hemicellulose, cellulose, and lignin. Hemicellulose is a polymer of short, highly-branched chains of mostly five-carbon pentose sugars (xylose and arabinose), and to a lesser extent six-carbon hexose sugars (galactose, glucose and mannose). Because of its branched structure, hemicellulose is amorphous and relatively easy to hydrolyze (breakdown or cleave) to its individual constituent sugars by enzyme or dilute acid treatment. Cellulose is a polymer of glucose sugars, much like starch, which is the primary substrate of corn grain in dry grain and wet mill ethanol plants. However, unlike starch, the glucose sugars of cellulose are strung together by β-glycosidic linkages which allow cellulose to form closely-associated linear chains. Lignin is a polymer of phenolic-like molecules, which can provide structural integrity to plants. In some embodiments, lignin can remains as a residual material after sugars in plant biomass have been fermented to ethanol.

In one embodiment, the solid fuel is any type of plastic biomass, such as thermoplastic. It is further possible that thermosetting plastics or thermosetting elastomers may work as a source of solid fuel. In one embodiment, the plastic biomass includes one or more plasticizers.

The solid biomass or fuel can be of any suitable size and shape as long as at least a portion of the biomass contacts the surface of the metal-based catalyst sufficiently to allow for heat transfer between the catalyst and the fuel. The overall processing rate is affected by many factors, including the amount of surface area contact between the solid biomass or catalyst. Other factors may include, but are not limited to, thermal conductivity of the solid fuel, mass transfer of the decomposed products from the solid fuel, and the thermal conductivity of the catalyst support, the rate of convection due to reactant gas flow rate, the emissivity of the selected catalyst and support and fuel, and so forth. In most embodiments, the solid biomass is comprised of particles of any suitable size or combination of sizes, although the invention is not so limited. In one embodiment, the particle size ranges from about 0.01 mm to about five (5) mm. However, particle sizes below about 0.2 mm may be less practical due to the energy required to produce such small particles.

Models examining cellulose particles contacting a hot surface have shown that temperature gradients within the particle should become insignificant for particle diameters one (1) mm or less. However, larger particles of one (1) to five (5)

mm have been shown to exhibit large temperature gradients at the hot surface interface, preventing a large fraction of the particle from slowly heating to form char. This was observed occasionally, as described in Example 2, as aggregated particles of cellulose as large as five (5) mm exhibited steady continuous processing without significant char formation, making it possible that this process could be extended to larger particles such as wood chips.

In one embodiment, the particle size is greater than about five (5) mm up to about 10 mm to about 100 mm, including any particle size between 10 and 100 mm. Particles larger than 100 mm may also be used, including particle aggregates, such as any type of pellet, chip or mass. In one embodiment, the biomass may be in its original form, or only slightly to partially size-reduced by any suitable means. Such whole or partially size-reduced biomass may include components such as corn stover, soy beans, leaves, grasses, trees, logs, and the like.

Catalysts useful in embodiments of the present invention provide oxidation of the solid fuel, including fuel which has decomposed to a liquid or volatile component at stoichiometries above and below the upper flammability limit of the reactant gases 132 (See FIG. 1). In one embodiment, the catalyst comprises one or more noble metals and/or one or more transition metals, as those terms are understood in the art. In one embodiment, the catalyst comprises one or more noble or transition metal in combination with one or more lanthanides. In one embodiment, noble and transition metals from Group 7, 1 and 7B on the periodic table are used. In one embodiment, noble or transition metals include Ni, Pd, Pt, Co, Rh, Ir, Fe, Ru, Os (Group VII) Cu, Ag, Au (Group 1B) and Re (Group VIIB). Lanthanides useful herein include La and Ce. In one embodiment, metal oxides are used. In a particular embodiment, the catalyst is a RhCe catalyst with the Rh and Ce combined in a 1:1 ratio, although it is likely that other ratios would work as well. It is also possible that various impurities may be present in the catalyst as is understood in the art that do not affect the reaction in a material manner.

The catalytic oxidation of the solid fuel or decomposed solid fuel occurs optimally at a carbon to oxygen ratio (C/O) of about 0.3 to about 2.5, where carbon is defined as carbon atoms in the solid fuel, and oxygen is defined as oxygen atoms in the oxidant stream (typically $O_2$ or air). Excess oxygen (i.e., C/O<0.3) will prevent formation of $H_2$ and CO. Too little oxygen (i.e., C/O>2.5) will not allow the system to be at a sufficiently high temperature (i.e., greater than about 400° C.) to prevent carbon formation on the catalyst surface and/or on the walls of the reactor itself. In one embodiment, C/O is about 0.7 to about 1.2.

Any suitable catalyst support having any suitable geometry and size may be used provided it can perform the intended function. A suitable catalyst support has a melting temperature above the operating temperatures, which may range from about 400 to about 1600° C. Such catalyst supports are sufficiently conductive, having a thermal conductivity of at least about 0.1 W/mK. In one embodiment, the catalyst support is made from foam, such as a ceramic foam. In one embodiment, the catalyst support is spherical in shape. In one embodiment, the catalyst support is comprised of a plurality of ceramic or alumina spheres.

In one embodiment, particles of starch, cellulose, lignin, and polyethylene ranging in size from 10 µm to one (1) mm are converted in a suitable reactor (e.g., See FIG. 1) to synthesis gas on a hot rhodium (Rh) surface of an approximately 30 mm catalytic bed without carbon formation at a level that stops the reaction. In one embodiment, this process occurs at a total gas residence time of less than about 60 milliseconds, which is more than about ten times faster than biomass gasification processes. The method further includes a relatively small reactor, which, in one embodiment, is as much as 10 times smaller than conventional biomass gasification processes.

The catalyst systems are also tolerant of various amounts of ash. The amount of ash that accumulates at any given time often corresponds to the amount of ash present in the solid fuel. If there is less than about 0.01 wt % of ash, then the syngas production process can continue almost indefinitely, in the absence of other limiting factors. Likewise, if there is greater than about 0.01 wt % of ash, then the process can continue indefinitely provided there is a continuous mechanical removal of ash from the leading face of the catalyst at about the rate at which it is formed.

Exemplary embodiments of the present invention will be further described by reference to the following examples. It should be understood, however, that many variations and modifications may be made while remaining within the scope of the invention.

Example 1

Experimental Reactor System

The reactor system 100 consisted of a reactor 102, which is a custom-made quartz tube of 19 mm inner diameter as shown in FIG. 1. The reactor 102 was glass blown by a glass worker at University of Minnesota and shaped using material made by Chemglass, Inc., having offices in Vineland, N.J. Approximately one (1) kg of solids 104 were loaded into a two liter solids hopper 106 and vibrated by a Sony Active subwoofer 108 Model no. SA-WM250 made by Sony Corporation having offices in New York, N.Y. The subwoofer 108 was connected to a GT0804 speaker 110 made by JBL, Inc. having offices in Woodbury, N.Y.

The solids 104 were moved to the reactor system 100 with use of a solid screw auger 112, i.e., a Servodyne brand mixer made by Cole-Parmer Instrument Co., having offices in Vernon Hills, Ill. Use of a subwoofer 108 and speaker 110 helped to prevent particle aggregation and also served to fill the solid screw auger 112 to capacity. The solid screw auger 112 was controlled by a Servodyne brand mixer controller (i.e., servo motor) 114 made by Cole-Parmer Instrument Co. During operation, the solids 104, e.g., small particles of cellulose and starch, moved through an inlet tube 116 into the reactor 102 and onto the front-face of a Rh—Ce catalyst 118.

Reactant gases 132 comprised of nitrogen and oxygen (99.9+% purity) were fed into the solids hopper 104, the connecting tube 116 and into the reactor 102 as shown in FIG. 1 from high-pressure cylinders (not shown). Methane gas 133 (99.9+% purity) was also added as a start-up gas to heat the catalyst, as described above, and was turned off after approximately two (2) minutes. Gas flow rate of all gases was controlled by a mass flow controller (not shown), Model 5800i made by Brooks Instrument, a division of Emerson Process Management, having offices in Hatfield, Pa. The reactant gases 132 and the start-up gas 133 were fed into the solids hopper 106, the connecting tube 116 and into the reactor 102 as shown in FIG. 1. A radial gas delivery valve 140 adjusted the amount of reactant gases 132 and, initially, the start-up gas 133 delivered at different radial positions at the reactor inlet 116. The solids 104, the reactant gases 132 and the start-up gas 133 entered the reactor 102 at approximately room temperature (25° C.) and near atmospheric pressure (approximately 1 atm).

Three separate catalyst supports 150, 152 and 154 were used as shown in the cut-away view of the reactor 102 in FIG. 1. The catalyst supports 150, 152 and 154 were foam cylinders approximately ten (10) mm in length, with a diameter of approximately 17 mm. Catalyst was loaded onto each support (150, 152, 154) by the method described below. A fourth catalyst support was used as a heat shield 156. The heat shield 156 reduced axial radiation heat losses downstream of the catalyst 118. Each of the four catalyst supports (150, 152, 154 and 156) were wrapped in ceramic paper (not shown) having a thickness of about one (1) mm. The ceramic paper was used to hold the catalyst 118 in place and prevent bypassing of gases around the catalyst supports (150, 152, 154 and 156). The catalyst and supports were then loaded into the reactor 102 as shown in FIG. 1.

Thermocouples 120 and 122 were placed after the first catalyst support 150 (approximately 10 mm downstream) and after the third catalyst support 154 (approximately 30 mm downstream) The exterior of the reactor 102 was wrapped with 1-inch thick ceramic fiber insulation 124 to minimize radial heat losses. Products 126 from the reactor 102 flowed through a condenser 128. A condensate collection vessel 134 collected effluent flow in and non-condensable gases flow out. In this way water which is produced in the reactor 102 is collected to prevent condensation in the lines. Samples of the uncondensed product stream were taken from a port 130 downstream of the condenser 128 with a gas-tight syringe and injected into a gas chromatograph (GC) for analysis. Typically, a sample was taken after continuously operating for approximately 20 min at a specified inlet composition and flow rate (of reactant gases and solid fuel).

During operation, reactor pressure was maintained near atmospheric (approximately 1 atm). A total solid flow rate of approximately 25 grams-per-hour was delivered to the catalyst 118 from the auger 112. To vary the fuel-to-oxygen ratio, the flow rate of the reaction gas 132 was varied from 0.8 to 1.2 standard liters per minute (25° C. and 1 atm). This total flow rate corresponds to calculated catalyst contact times of approximately 40 to 60 ms at an entering reactant temperature of 800° C. and pressure of 1 atm.

The feed stream is reported as the carbon-to-oxygen ratio (C/O). C/O is defined as the number of moles of carbon atoms entering as the fuel divided by the number of moles of oxygen atoms from $O_2$ in the mixture.

Starting Materials.

The cellulose used herein was produced from cotton by Sigma Aldrich Co. having offices in Saint Louis, Mo., in microcrystalline powder form, with an average particle diameter of about 20 micrometers (Product No. 310697-1 KG).

Catalyst and Catalyst Supports

The catalyst support was an 80 pore per linear inch (ppi), 17 mm OD, and 10 mm length cylindrical a-alumina (92% $Al_2O_3$, 8% $SiO_2$) foam. The catalyst foams comprised 80 ppi 92% alumina/8% silica foam monoliths from Vesuvius Hi-Tech Ceramics Co. having offices in Alfred, N.Y. The catalyst foams were coated with approximately 2.5 wt % Rh and 2.5 wt % Ce. The Rh—Ce coated foams were coated using a "wet impregnation method" as is well-known in the art, comprising dropping an aqueous solution of $Rh(NO_3)_3$ and $Ce(NO_3)_3 \cdot 6H_2O$ onto the foam. The Rh—Ce coated foams were then dried and calcined in air at 600° C. for 6 h.

The rhodium (Rhodium (III) nitrate solution, Rh 10% purity, w/w (cont. Rh) (Item #12633) was supplied by Alfa Aesar having offices in Ward Hill, Mass. The cerium (Cerium (III) nitrate hexahydrate) (99.99% purity) was supplied by Sigma-Aldrich.

Reactor Start-Up and Shutdown

To initiate the autothermal reforming of the nonvolatile biomass, $CH_4$ and air were passed over the catalyst at 350° C. and reacted to form synthesis gas ($H_2$ and CO), releasing high levels of heat. Once the catalyst surface reached temperatures>1000° C., the extruder dispersed small solid particles (mixed with the reactant gases) directly onto the hot catalyst surface. Gradually, the inlet stoichiometries for the reactant gases 132 and solid fuel 104 were adjusted to enable the solid fuel to autothermally reform in air without the addition of $CH_4$.

When the reactor 102 was shut-down, the start-up gas 133 was reintroduced into the reactor 102, and the solid feeding was terminated. The stoichiometry of the start-up gas 133 and the reactant gases 132 was adjusted to produce back-face temperatures of approximately 1000° C. The reactor 102 was operated at this temperature for approximately 10 min. Then, one of the reactant gases 132 (i.e., oxygen) and the start-up gas 133 (i.e., methane) were removed from the reactor 102, which was then cooled by the other reaction gas 132, namely nitrogen.

Product Analysis

Product gases were analyzed using an HP 6890 GC equipped with a capillary column (J&W Scientific PLOT-Q) and thermal conductivity detector (TCD). This system was capable of separating and detecting permanent gases, higher hydrocarbons, olefins, aromatics, alcohols, ketones, and aldehydes. Compounds that condensed in the condenser were considered unreacted fuel and reflected in the fuel conversion. Some of these condensed compounds may be reacted fuel, and thus, the actual fuel conversion may be higher than reported.

Cellulose is a polysaccharide that contains repeated β-glucose ($C_6H_{12}O_6$) monomers. Starch is a polysaccharide that contains repeated α-glucose ($C_6H_{12}O_6$) monomers. The average molecular formula of these compounds was used to calculate approximate C/O compositions flowing through the reactor.

Product selectivities were calculated on an atomic basis. C and H atom selectivities were calculated as the molar ratio of a specified product to the sum of all products, scaled to account for stoichiometry. For solids containing some moisture, the water was not considered fuel. Thus, if $H_2$ is produced from the conversion of water and fuel, the $H_2$ selectivity could exceed 100%. The carbon atom balance was closed to determine the fuel conversion, and the oxygen atom balance was closed to determine the water molar flow rate.

Results

Figure 2:
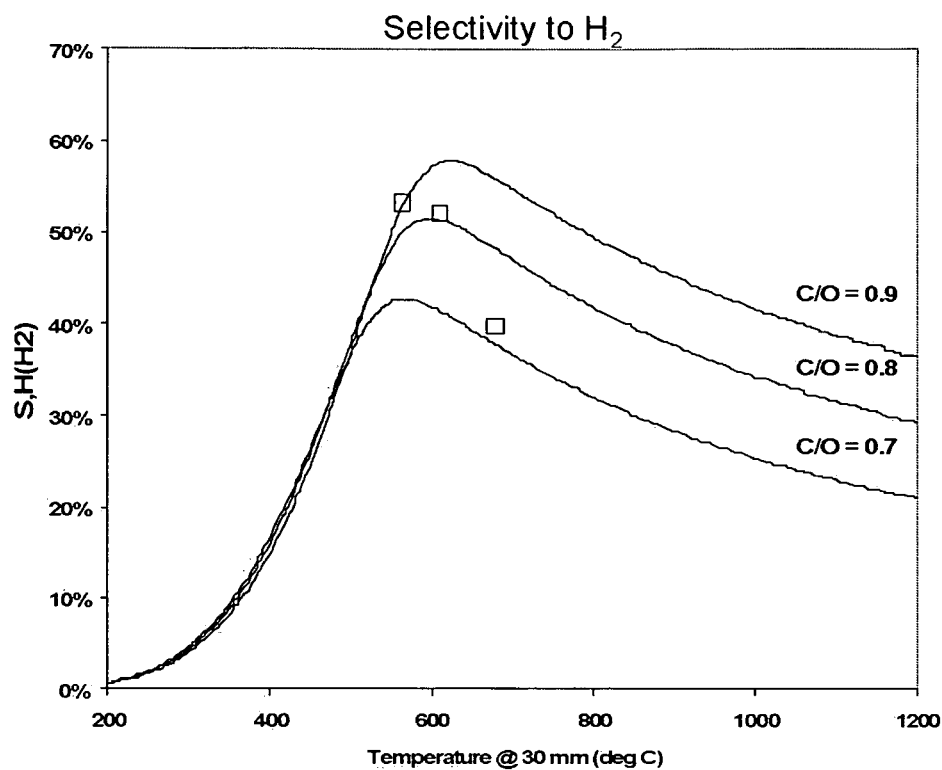
FIG. 2 shows selectivities to hydrogen versus temperature 30 mm downstream from catalyst front face at various carbon to oxygen ratios (C/O) in accordance with embodiments of the invention.

Results for refined cellulose as fuel are shown below in Table 1. Results are also shown in FIG. 2 for selectivities to $H_2$ (y-axis). Experimentally observed selectivity to $H_2$ from the reactive flash volatilization of cellulose (~10 μm). Solid lines represent equilibrium at three C/O for the temperature range 200-1200° C. Approximately 55% $H_2$ was achieved at C/O=0.9. The temperature 30 mm downstream from the front face, which is generally cooler than the front face where oxidation reactions occur, decreased from 700° C. to 500° C. as C/O increased from 0.7 to 0.9 (x-axis).

TABLE 1

Autothermal reforming of cellulose

| Experiment # | Cellulose 1 |
|---|---|
| Fuel Properties | |
| Avg. Particle Size (μm) | 20 |
| Ash (wt %) | 0.002 |
| Water (wt %) | 6.0 |
| Exp. Conditions | |
| Support | Foam |
| Carbon/oxygen | 0.90 |
| Mass Flow (g/hr) | 30 |
| Residence Time (ms) | 62 |
| T at 10 mm (° C.) | 759 |
| T at 30 mm (° C.) | 593 |
| H Selectivity (%) | |
| $H_2$ | 58 |
| $H_2O$ | 39 |
| C Selectivity (%) | |
| CO | 36 |
| $CO_2$ | 63 |
| $CH_4$ | 1.3 |
| $C_2H_4$ and $C_3H_6$ | — |
| $H_2$/CO | 1.31 |

The support labeled "foam" consisted of 2.5 wt % (approximately 0.05 g) Rh and 2.5 wt % Ce on 45 ppi α-$Al_2O_3$ foams for the first 10 mm. The support foam from 10 mm to 30 mm consisted of 2.5 wt % Rh and 2.5 wt % Ce on a 5 wt % γ-$Al_2O_3$ washcoat supported on 80 ppi α-$Al_2O_3$ foams. Selectivity was defined as (C or H atoms in product)/(C or H atoms in converted fuel). Conversion was >99% for all considered experiments. All experiments were conducted with reaction gas stoichiometry, $N_2/O_2$=3.76. All reported particle size mass averages were measured by light scattering.

Example 2

Additional experiments with various solid fuels were performed using the reactor described in Example 1. The specific procedure and starting materials are described below.

Methods.

All experiments were conducted over Rh-based catalysts with a Ce additive on α-$Al_2O_3$ supports 17 mm in diameter and 10 mm in length consisting of either 45 or 80 pores per inch. A slurry of γ-$Al_2O_3$ washcoat has been added drop-wise, dried, and heated to 600° C. for 6 hrs where indicated before catalyst impregnation. Catalysts were prepared by the incipient wetness technique using aqueous solutions of $Rh(NO_3)_3$ and $Ce(NO_3)_3 \cdot 6H_2O$ resulting in loadings of 2.5 wt % of the alumina support for each metal. Dried catalysts were calcined at 600° C. for 6 hrs in air. The quartz reactor tube as described in Example 1 was loaded with three catalyst-impregnated supports and a fourth 80 ppi blank alumina support wrapped in ceramic paper to prevent gas bypass. K-type thermocouples were inserted after the first and third monolith.

The entire reactor was wrapped in one inch of ceramic insulation. The system was initially heated by methane partial oxidation to 800° C. after which a continuous flow of solid particles was immediately applied to the front catalyst surface. Methane was removed from the system and the flow rate of air was adjusted to satisfy 0.6<C/O<1. No external heating system was required. Solids flow was metered from a hopper by a feed screw at an electronically controlled rate. Product gases passed through a water-cooled condenser and mixing volume (approximately one (1) L), and subsequently sampled with a gas-tight syringe for analysis with a GC. Aspen chips were dried in an oven, and ground over a 20 mesh sieve. Moisture and ash content were determined gravimetrically. All reported data represent an average of at least three measured data points.

Starting Materials.

The cellulose used in Experiments 2 and 3 as shown in Table 2 was Lattice NT 200 microcrystalline cellulose supplied by FMC Biopolymer having offices in Philadelphia, Pa.

The starch in Experiment 4, as shown in Table 2, was obtained from Bob's Red Mill All Natural Small Pearl Tapioca Co. having offices in Milwauki, Oreg. This starch was extracted from a cassava plant, resulting in spherical particles, each having a diameter of about two (2) mm. The spheres were ground in-house over a size 20 mesh to about 750 micrometers.

The polyethylene used in Experiment 8, as shown in Table 2, was low density polyethylene (LDPE) (Product No. 427772-1 KG) having an average Mw of approximately 5000 by GPC and an average Mn of approximately 1700 by GPC, was supplied by Sigma-Aldrich. The polyethylene used in experiment 7, as shown in Table 2, was also LDPE in the form of 500 micron polyethylene powder (A 10239) supplied by Alfa Aesar.

Aspen wood (*Populus tremuloides*) were obtained from trees in Rosemont, Minn. The tree logs were chipped and dried to about five (5) wt % moistures. The chips were then ground over a size 20 mesh to about approximately 750 micrometers using a grinder. Aspen is comprised of approximately 66.7% cellulose and hemicellulose and approximately 25% lignin, with the remaining fraction consisting of uronic acids and extractives, and ash (approximately 0.5%) [9]. More precisely, Aspen wood typically comprises about 44.5 wt % glucan, 17.7 wt % xylan, 1.3 wt % galactan, 0.5% arabinan, 1.7 wt % mannan, 21.2 wt % klason lignin, 3 wt % acid-soluble lignin, 2.1 wt % extractives, 0.5 wt % ash, and 7.6 wt % acetyl and uronic acid groups.

Catalyst and Catalyst Supports.

The catalyst used was as described in Example 1. The foam support used was as described in Example 1. The foam was coated with catalyst in the same manner as described in Example 1. Foam was used in Experiments 2, 4 and 6-8.

In experiments 3 and 5, 99.9% $Al_2O_3$ spherical supports (SA 52124 1.3 mm) supplied by Saint-Gobain Nor Pro company having offices in Stow, Ohio, were used.

Results.

Figure 3:
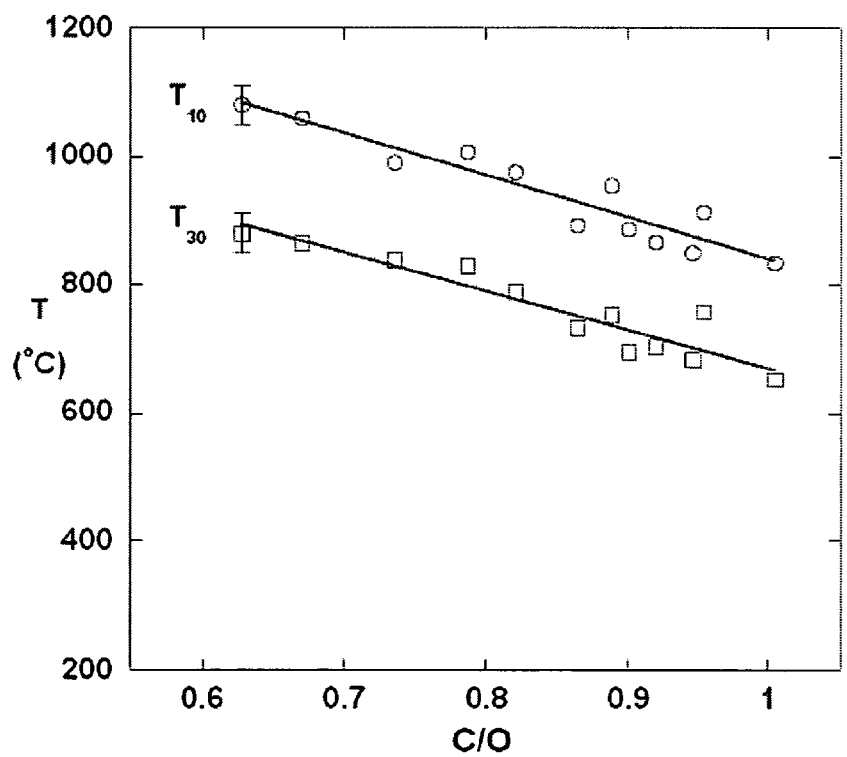
FIG. 3 shows temperature versus C/O for conversion of cellulose particles (approximately 225 micrometers in size) with temperature measured 1) 10 mm from the catalyst front face $T_{10}$(○), and 2) 30 mm from the catalyst front face, $T_{30}$ (□) in accordance with embodiments of the invention.
Figure 4:
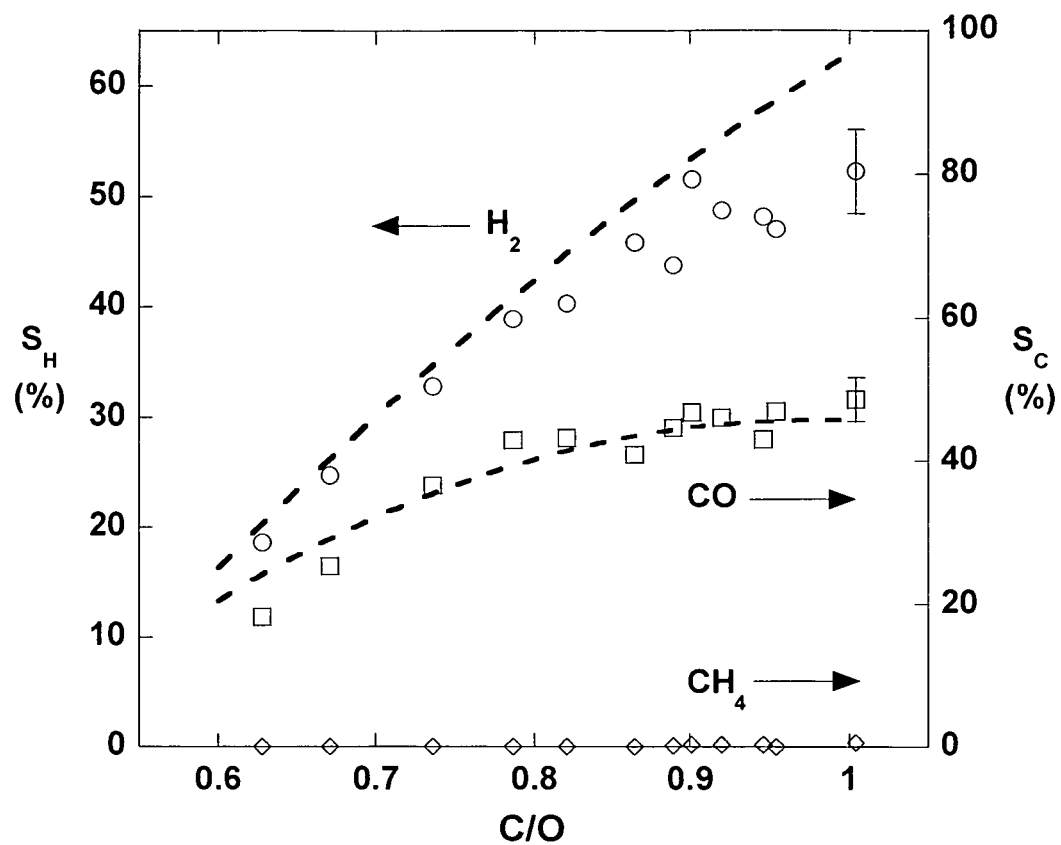
FIG. 4 shows selectivity versus C/O for $H_2$ (○), CO (□), and $C_1$ (◇) in accordance with embodiments of the invention.

The results of this approach are illustrated in FIGS. 3 and 4, which show the effect of varying the ratio of cellulose feed rate to air feed rate defined as C/O (carbon atoms from fuel/oxygen atoms from air) on the steady-state operating temperatures and selectivity to synthesis gas products. All solids enter the reactor in air at room temperature converting completely within 50 ms, with no process heat is added $S_C$ and $S_H$ are defined as (C or H atoms in product)/(C or H atoms in converted fuel).

Specifically, FIG. 3 illustrates observed temperature measured with a thermocouple at 10 mm and 30 mm depth in a fixed bed foam catalytic reactor processing ~10 μm cellulose by reactive flash volatilization; and FIG. 4 illustrates observed selectivity to $H_2$, CO, and $CH_4$ from the reactive flash volatilization of cellulose (~10 μm). Dashed lines represent equilibrium at the experimentally determined C/O and measured reaction temperature. Error bars represent 95% confidence intervals.

The measured temperatures consistently decreased approximately 150° C. from 10 mm to 30 mm downstream from the front of the catalytic bed, but never decreased below 600° C. into the region at which surface carbon becomes a thermodynamic product. At these temperatures, only $H_2$, $H_2O$, and one-carbon products such as CO, $CO_2$ and $CH_4$, are thermodynamically predicted, and the observed products achieved this behavior well with selectivity to $H_2$ and CO of approximately 50% in approximately 50 milliseconds.

Figure 5B:
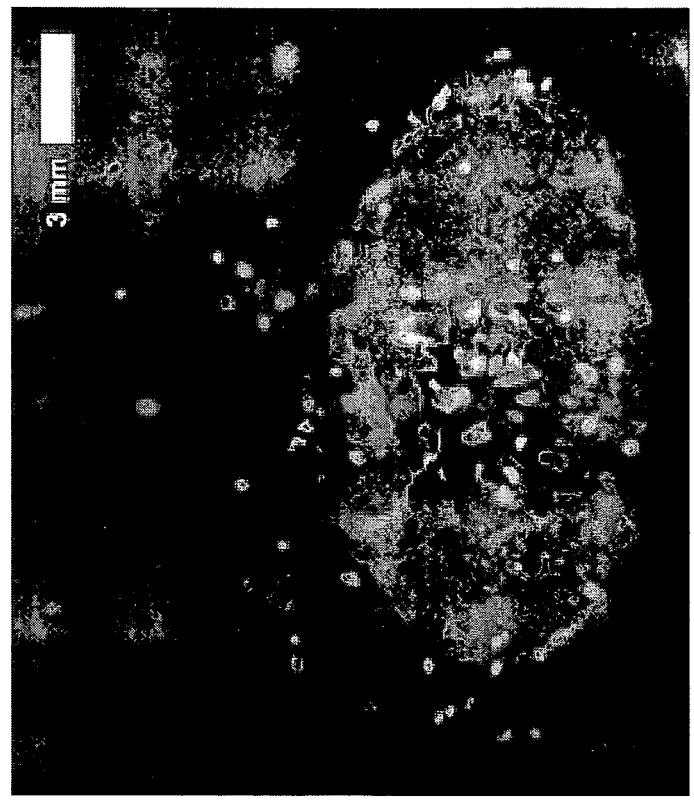
FIG. 5B is a photograph showing catalyst front face (0 mm) of flash volatilization of approximately 225 micrometer particles of cellulose in the presence of nitrogen, oxygen and methane, in accordance with an embodiment of the invention.
Figure 5A:
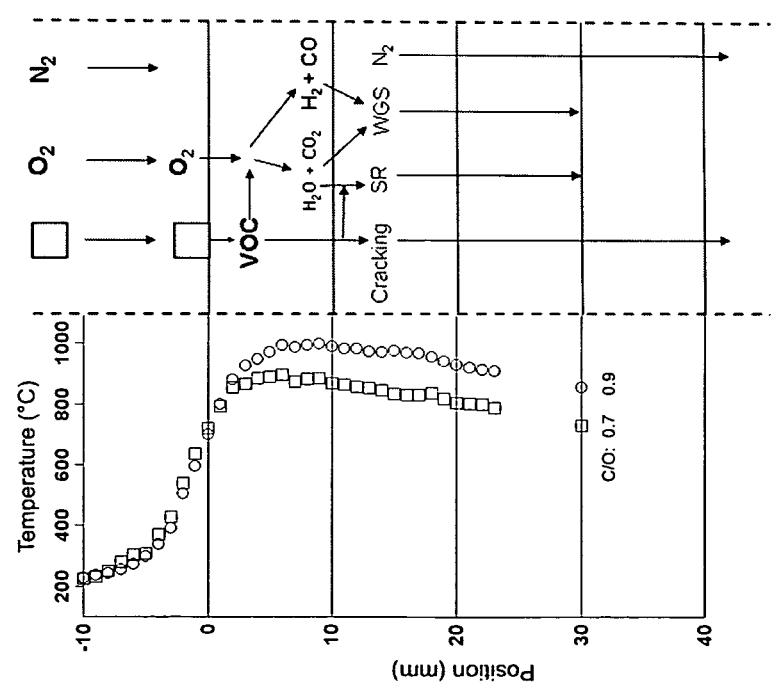
FIG. 5A shows surface and gas temperature of cellulose (□) reactive flash volatilization with reaction scheme diagram of volatile organic compounds (VOC) undergoing oxidation, steam reforming (SR), water-gas-shift (WGS), and cracking reactions in accordance with embodiments of the invention.
Figure 6:
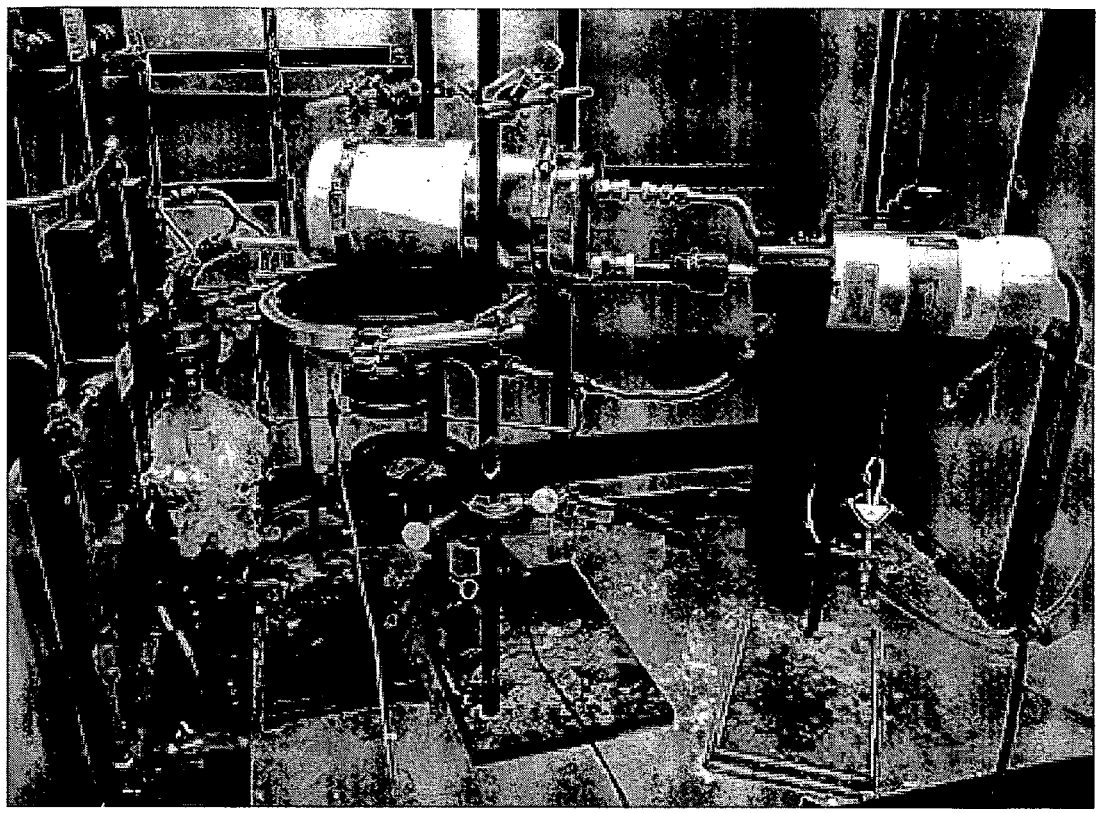
FIG. 6 illustrates a photograph of an experimental setup for flash volatilization of solid fuels.
Figure 7:
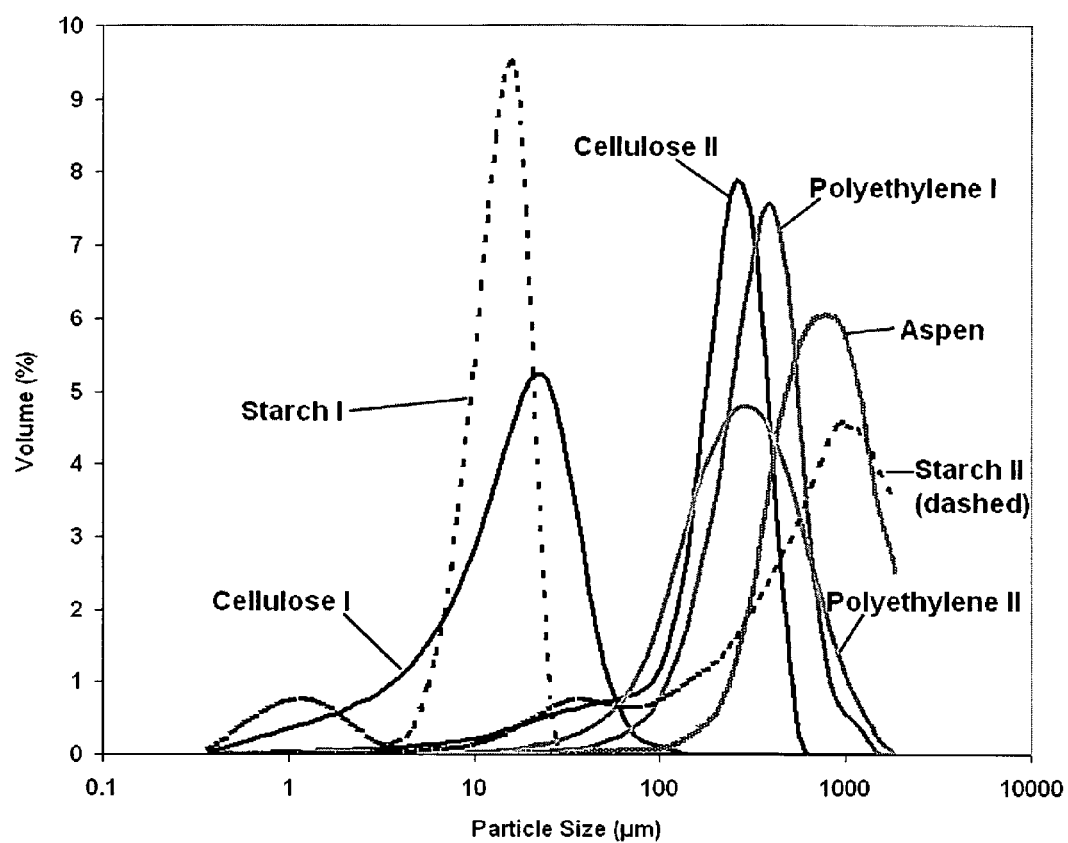
FIG. 7 illustrates particle size distribution of multiple selected solid fuels.
Figure 8:
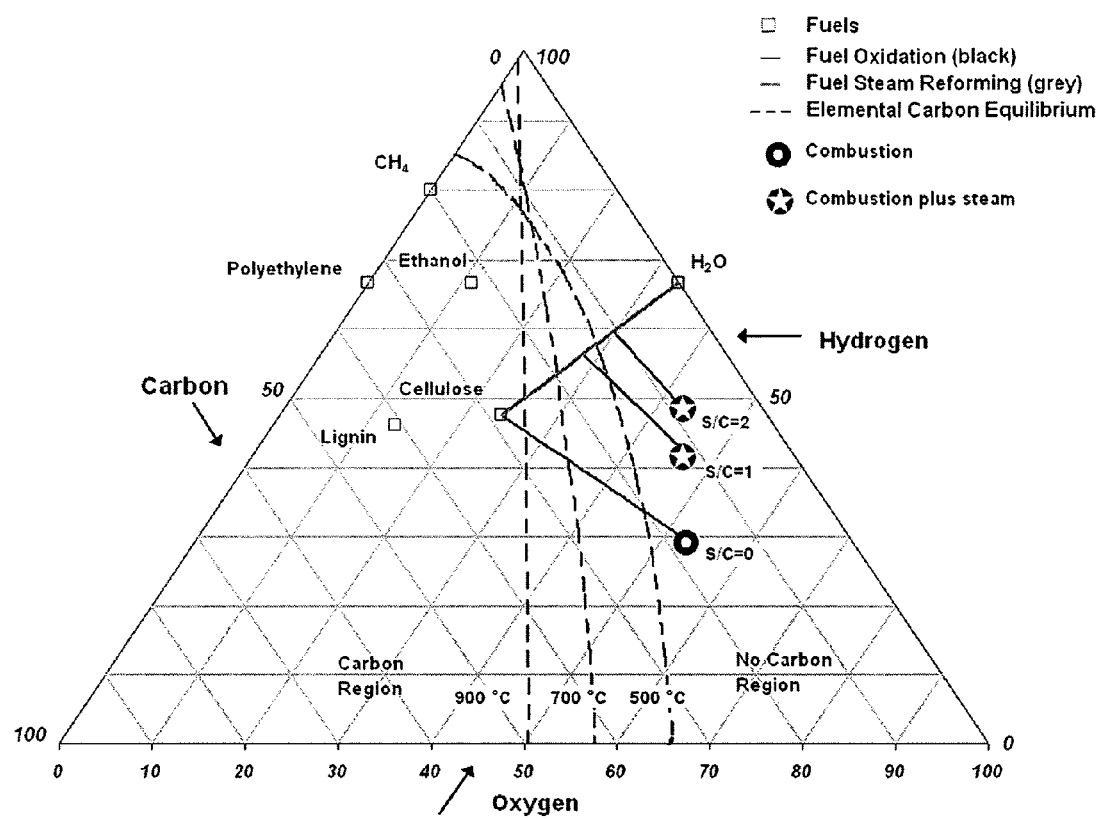
FIG. 8 illustrates the formation of solid carbon, $C_S$, by processing of solid, organic feedstocks such as cellulose, lignin, polyethylene, or ethanol inhibits the use of catalysts due to surface poisoning. Dashed lines represent the interface between the region for which $C_S$ is predicted as a thermodynamic product, and the region for which it is not, at 500, 700, and 900° C. The stoichiometry of steam reforming (solid grey line) cellulose oxidation and autothermal steam reforming (solid black lines) demonstrate that conversion to combustion products or synthesis gas occurs near the interface of these two regions permitting autothermal carbon-free processing.

FIG. 5A illustrates gas temperature for processing cellulose particles at C/O ratios of 0.7 (circles) and 0.9 (square), and the reaction diagram for VOCs undergoing oxidation, steam reforming (SR: $VOC+H_2O=H_2+CO$), water gas shift (WGS: $H_2O+CO=H_2+CO_2$), and cracking reactions. The photograph (FIG. 5B) shows the front face (0 mm) of the catalyst during millisecond reforming of approximately 230 mm diameter particles of cellulose in air.

This technique, described in FIG. 5A directly contacts solid particles with a glowing hot surface at about 700 to about 800° C. to rapidly heat and avoid significant char formation. Volatile organic compounds produced from rapid heating convect forward in the reactor foam, mix with air, and undergo surface oxidation reactions within millimeters of the reactor front surface. Surface oxidation reactions are highly exothermic and produce a rapid increase in both gas and catalyst support temperature. Rapid temperature increase within the catalyst support generates a large thermal heat flux, approximately 1 $MW/m^2$, backward in the reactor against the flow of reactant to the foam surface maintaining the high temperatures necessary for rapid particle volatilization. The accompanying photo in FIG. 5B of a reactive flash volatilization reactor shows that the front catalyst face remains red hot when operating with a continuous flow of cellulose particles in air.

Gas temperature profiles in FIG. 5A also show that the catalytic bed cools significantly from about 10 mm to about 30 mm as the remaining volatile organics and gases likely undergo endothermic chemistry. Water produced from complete oxidation in the first ten (10) mm can react with volatile organics to produce additional moles of gases on the catalyst surface. Volatile organics can also undergo endothermic gas-phase cracking reactions to produce smaller molecules. These experiments were designed to maximize surface chemistry to synthesis gas by using α-alumina foams with small macropores, and an additional γ-alumina washcoat layer to improve mass transfer to the catalytic surface.

Table 2 below also shows that the saturated hydrocarbon polymer, low density polyethylene, produces high selectivity to $H_2$ ($S_H$ approximately 73%) and CO ($S_C$ approximately 68%). The absence of oxygen atoms in the polymer permits significantly higher equilibrium selectivity to $H_2$ and CO than the oxygen-containing polymers starch and cellulose. Another key difference is that highly volatile oxygenated compounds exhibit very high conversion in millisecond contact-time reactors, [11] while polyethylene produces small hydrocarbons, including olefins, which do not react completely to synthesis gas even at low C/O ratios. Under high operating temperatures, these olefins are believed to be formed from the homolysis of the parent polymer to radicals and subsequent beta-scission or beta-hydrogen elimination [12,13]. Increasing the C/O reduces the likelihood that produced olefins will oxidize to synthesis gas possibly explaining the selectivity to ethylene and propylene increase from 2% to 9% in experiments 6 and 7. Extending to higher C/O for saturated hydrocarbon polymers could provide higher yields of these and larger polymer building blocks.

With respect to Table 2, the support labeled "foam" consisted of 2.5 wt % (approximately 0.05 g) Rh and 2.5 wt % Ce on 45 ppi α-$Al_2O_3$ foams for the first 10 mm. The support foam from 10 mm to 30 mm consisted of 2.5 wt % Rh and 2.5 wt % Ce on a 5 wt % γ-$Al_2O_3$ washcoat supported on 80 ppi α-$Al_2O_3$ foams. The support labeled "spheres" consisted of 30 mm in length of 1 mm diameter spheres with 5 wt % γ-$Al_2O_3$ washcoat and the same amount of Rh and Ce as used in the foam. Selectivity was defined as (C or H atoms in product)/(C or H atoms in converted fuel).

Conversion was >99% for all considered experiments. All experiments were conducted with air stoichiometry, $N_2/O_2$=3.76. MW from polyethylene in experiments 6, 7 & 8 was measured by GPC and is reported as a mass average. All reported particle size mass averages were measured by light scattering. Aspen wood chips were dried and ground over a size 20 mesh.

TABLE 2

Selected experimental data for the autothermal reforming of solid particles

| | Cellulose | | Starch | Aspen | Polyethylene | |
| | | | | | MW 50,000 | MW 5,000 |
| --- | --- | --- | --- | --- | --- | --- |
| Experiment # | 2 | 3 | 4 | 5 | 6 | 7 | 8 |
| Fuel Properties | | | | | | | |
| Avg. Particle Size (μm) | 225 | 225 | 691 | 781 | 368 | 368 | 341 |
| Ash (wt %) | 0.025 | 0.025 | 0.06 | 0.50 | <0.01 | <0.01 | <0.01 |
| Water (wt %) | 5.2 | 5.2 | 9.1 | 5.4 | 0 | 0 | 0 |
| Exp. Conditions | | | | | | | |
| Support | Foam | Spheres | Foam | Spheres | Foam | Foam | Foam |
| Carbon/oxygen | 1.00 | 1.00 | 1.00 | 0.85 | 0.65 | 0.8 | 0.7 |
| Mass Flow (g/hr) | 30 | 30 | 30 | 20 | 30 | 30 | 25 |
| Residence Time (ms) | 60 | 66 | 69 | 89 | 22 | 30 | 20 |
| T at 10 mm (° C.) | 833 | 615 | 867 | 676 | 867 | 754 | 1102 |
| T at 30 mm (° C.) | 652 | 537 | 716 | 488 | 695 | 642 | 717 |
| H Selectivity (%) | | | | | | | |
| $H_2$ | 52 | 56 | 55 | 51 | 69 | 61 | 71 |
| $H_2O$ | 46 | 39 | 41 | 34 | 28 | 25 | 18 |

TABLE 2-continued

Selected experimental data for the autothermal reforming of solid particles

| | Cellulose | | Starch | Aspen | Polyethylene MW 50,000 | | MW 5,000 |
|---|---|---|---|---|---|---|---|
| Experiment # | 2 | 3 | 4 | 5 | 6 | 7 | 8 |
| C Selectivity (%) | | | | | | | |
| CO | 49 | 39 | 37 | 29 | 71 | 53 | 66 |
| $CO_2$ | 50 | 59 | 62 | 65 | 26 | 25 | 24 |
| $CH_4$ | 0.6 | 2.2 | 1.5 | 4.2 | 1.0 | 1.4 | 1.0 |
| $C_2H_4$ and $C_3H_6$ | — | — | — | 2 | 2 | 9 | 6 |
| $H_2/CO$ | 0.99 | 1.31 | 1.21 | 1.27 | 1.04 | 1.06 | 1.09 |

Example 3

This prophetic example provides additional variations that may be used in conjunction with the methods described in Examples 1 and/or 2. Variations in procedure may be necessary depending on the type of solid fuel being tested. For example, for solids with low melting points, the feed system should prevent melting in the metering device. This could be done using a heat exchanger as a water cooler.

Testing can further be done with other forms of materials. For example, to determine the effect of lignin, a three-dimensional polymer of phenyl-propane monomers, on carbohydrate processing, a cellulose sample containing 25 wt % lignin can be separated from Aspen wood chips by soda pulping.

In order to test directly with Aspen chips, a strategy for handling the approximately 0.5% ash can be used. The ash, of which the minerals Ca, K, and Mg make up over 90% in the form of oxides and carbonates, exhibits very low vapor pressure. [10] These nonvolatile components can be removed in a moving Conclusion Embodiments of the present invention provide a system and method for volatilizing solid fuel to produce synthesis gas using reactive flash volatilization. This method provides the potential for small-scale synthetic liquid fuel production. Reactor systems operating with 50 millisecond residence times are at least an order of magnitude smaller than conventional systems and exhibit high power densities of approximately 5 kW/L of catalytic reactor volume (calculated for cellulose at C/Oapproximately1). At these conditions, approximately ⅔ of the fuel value of the biopolymer is retained as synthesis gas. [16] The system can operate in air or in reactant gases containing only nitrogen and oxygen together. The system can further operate over a wide range of pressures above 1 atm, up to about 150 atm with rapid startup times of less than about five (5) minutes on catalysts that have been operated for approximately 20 hrs, without significant evidence of catalyst deactivation. Secondary processing to synthetic fuels could occur conventionally in a Fischer-Tropsch reactor [17,18] to methanol, dimethyl ether, or synthetic gasoline and diesel.

Unlike some conventional methods of forming synthesis gas, the methods of reforming solid fuels herein do not require a source of thermal energy such as the addition of light hydrocarbons including methane and/or ethane or heat addition to the reactor, externally through the reactor walls or internally with a heat carrying agent, yet are capable of operating continuously on millisecond time scales. [19]

Example 4

Three-Chemistry Particle Volatilization by Reactive Flash Volatilization of Cellulose. This example uses the processes described above in conjunction with the addition of steam, and the removal of nitrogen, which alters both the ratio of feed gasses necessary, and the production rate of $H_2$ relative to CO.

Three biomass-to-liquid process chemistries (volatilization of cellulose, tar cleaning of organic products, and water-gas-shift of the gaseous effluent) have been integrated into a single autothermal catalytic reactor for the production of high quality synthesis gas at millisecond residence times (<30 ms). Particles of cellulose (~300 μm) were directly impinged upon the hot, catalytic bed of RhCe/γ-$Al_2O_3$ catalyst on 1.3 mm α-$Al_2O_3$ spheres in the presence of $O_2$, $N_2$, and steam in a continuous flow fixed-bed reactor at 500-1100° C.

Complete conversion to gases was observed for all selected experimental parameters including $N_2/O_2$, S/C, the total flow rate of cellulose, and the fuel-to-oxygen ratio (C/O). The addition of steam increased selectivity to $H_2$ and decreased selectivity to CO in accordance with water-gas-shift equilibrium. Optimal conditions produced a clean gaseous effluent which exhibited 80% selectivity to $H_2$ at a synthesis gas ratio of $H_2/CO=2.3$ with no dilution from $N_2$ at a conversion efficiency of ~75%. Carbon-free processing was explained by relating the domain of experimental parameters to the thermodynamic prediction for the formation of solid carbon, $C_S$.

The steam-to-carbon ratio is defined as the molar flow rate of steam ($H_2O$) relative to the molar feed rate of carbon in the solid fuel. In the process described herein, the steam-to-carbon ratio can be varied from $0 \leq S/C \leq 10$.

The use of a diluent (in this case $N_2$) can cause economic problems when the reactor is connected to other equipment. Therefore, it has been shown that the reactor can be operated without any diluent gas ($N_2/O_2=0$). Other diluents could be used (e.g., He, Ar), accordingly, the $N_2/O_2$ ratio is a type of "diluent ratio", defined as the molar feed flow rate of diluent gases (e.g., $N_2$, He, Ar) relative to the molar feed flow rate of oxygen. An acceptable range of diluent ratios is about zero to about ten, about 0.1 to about 8, about 0.5 to about 5, or about 1 to about 3.

Introduction

Lignocellulosic biomass in the form of trees, grasses, and agricultural residues provides a realistic source for sustainable production of carbon-based fuels and chemicals. Recent analysis by the U.S. Department of Agriculture estimates that annual production of lignocellulosic biomass could exceed one billion dry tons by the mid-21st century providing sufficient energy to supplant a significant fraction of existing demand for fossil fuels. The dominant structure in all nonfood sources of biomass, lignocellulose, consists of the biopolymers cellulose, hemicellulose, and lignin in a design that provides optimal materials properties to plant structures while resisting chemical degradation. These same properties also prevent the direct utilization of most conventional petroleum processing equipment thereby driving the development of new technology for handling and processing solid, carbonaceous materials.

Conversion of biopolymers to synthesis gas ($H_2$+CO) and subsequent production of synthetic fuels is a major thermochemical processing route commonly called biomass-to-liquid (BTL). The entire BTL process consists of a combination of individual unit operations including biomass preparation, gasification, synthesis gas cleaning, synthesis gas processing, synthetic fuels production, and synthetic fuels refining. The availability of technologies and number of process variables for each process step provides an enormous number of configurations and design options which must be evaluated as an integrated system for optimal process development. The overall process competes economically with existing biological processes (i.e. corn to ethanol) as demonstrated by a recent process design analysis of the BTL process for the production of ethanol from wood.

The efficacy of the BTL process can be enhanced by either improving the performance of any single process step, or by eliminating or combining process steps. A significant opportunity for process improvement exists with synthesis gas production and preparation. Conversion to clean, conditioned synthesis for a synthetic fuels reactor can dominate process economics as this equipment can comprise 60-75% of the total process investment.

At least three BTL process steps (gasification, tar-cleaning, and water-gas-shift) can be combined as a one-step millisecond residence time reactor for continuous operation. Each of these steps provides a necessary process function and contributes a non-negligible capital and operating cost. Conventional biomass gasifiers (updraft, downdraft, and fluidized bed) partially oxidize biomass to a gaseous syngas-rich effluent that commonly contains impurities such as tars and aromatics, unconverted oxygenated organics, nitrogen-containing species such as $NH_3$ or HCN, and soot. Organic impurities must be selectively removed to ppm levels by one of a large selection of technologies that can be categorized into wet scrubbing, dry scrubbing, or hot gas conditioning. Existing techniques applicable to the integrated reactor considered here include steam reforming and partial oxidation of tars and organics using Ni, Pt, or Rh metal catalysts. Biomass-derived synthesis gas typically exhibits a $H_2$/CO~1.0, and an additional process step must also adjust the ratio of $H_2$ to CO by the water-gas-shift reaction for synthetic fuel reactors to produce Fischer-Tropsch alkanes ($H_2$/CO~2), methanol for dimethyl ether ($H_2$/CO~2), or mixed alcohol fuel ($H_2$/CO~1.2).

An extremely short residence time (ms) reactor integrating at least three process steps provides the possibility for dramatic improvement in the utilization of biomass for synthetic fuels. Conventional gasifiers exhibit residence times on the order of seconds to minutes, while catalytic partial oxidation of organic compounds occurs in milliseconds permitting a reduction in biomass reactor size by at least an order of magnitude. Additionally, combined chemistries permit smaller overall processes by eliminating multiple process vessels and ancillary equipment. The capital costs of traditional BTL equipment has restricted the processes to large scales (~400 $MW_{th}$) demanding an abundant, local supply of biomass. Small efficient processes allow for localized processing facilities, reducing problems associated with biomass transportation.

A highly integrated, millisecond biomass reactor operates faster and with more functionality than a large number of existing catalytic gasifiers. There exist numerous experimental examples of the integration of metal catalysts such as Ni, Co, and Rh with conventional fluidized bed gasifiers to reduce the production of char and tars in situ. Most gasification catalysts exhibit deactivation and poisoning due to the development of surface carbon (coke) and char and the condensation of inorganic ash. Rh-based catalysts with the addition of Ce have exhibited significant resistance to the formation of coke in the oxidative reforming of tars and organics. Additionally, catalytic partial oxidation of highly oxygenated organic compounds such as ethylene glycol and glyercol on Rh—Ce catalysts has selected for equilibrium concentrations of synthesis gas during steady, autothermal operation on millisecond time-scales. The utilization of Rh—Ce fluidized catalytic beds integrated with volatilization of carbohydrate-rich solids has demonstrated reduced tar formation, but has been restricted to net-endothermic chemistry and residence times on the order of one second.

The direct impingement of solid particles of carbohydrate-rich biomass with a hot (T>700° C.), catalytic surface in thermal contact with a catalytic bed provides an optimal situation for fast, integrated processing of nonvolatile feedstock material. This technique, referred to as 'reactive flash volatilization', has recently been demonstrated on Rh—Ce catalytic beds for the air-blown reforming of soy oil, cellulose, and lignocellulose. Multiple zones of chemistry (volatilization, oxidation, and reforming) provide sufficient chemical routes to synthesis gas. Particles contacting a hot surface volatilize to gases and volatile organic compounds (VOCs) which can flow into the catalyst bed and oxidize to synthesis gas and combustion species. Gases and VOCs remaining after >99% oxygen conversion can steam reform to gases and equilibrate by the water-gas-shift (WGS) reaction. Autothermal processing is permitted between endothermic zones (volatilization and reforming) and the exothermic oxidation chemistry through carefully balanced heat transfer by conduction in the alumina catalyst support and convection forward by the process gases.

The adjustment of chemistry and heat transfer by the addition of steam and removal of feed $N_2$ provides the opportunity to reduce effluent synthesis gas dilution and fully integrate the water-gas-shift step within the millisecond reactor. Rh—Ce catalysts have demonstrated strong activity for the water-gas-shift reaction on millisecond time-scales. The tunability of the synthesis gas ratio has been demonstrated by adjusting the feed S/C (steam-to-carbon) ratio, the C/O (carbon-to-oxygen) ratio, the $N_2/O_2$ (feed nitrogen/feed oxygen) ratio, and the total flow rate of solid material. Spatial temperature measurements were conducted along the axis of the catalyst bed to analyze system behavior and define process limitations. Additionally, system performance was analyzed through thermodynamic analysis, and the domain of operation is presented for considered feed parameters. Finally, the results lead to the development of an autothermal, steady-state operating configuration that permits integration of gasification, tar-cleaning, and water-gas-shift chemistry in the absence of nitrogen at high process feed rates and millisecond residence times.

Reactor Design.

The autothermal steam reforming of cellulose was performed in a 20 mm I.D., 22 mm O.D quartz tube. A 17 mm O.D. ceramic foam monolith, used to support the 30 mm bed of spherical catalysts, was inserted into the quartz tube from the bottom and held in place via friction fit against the reactor wall with a ceramic cloth.

Cellulose was fed to the top of the reactor tube with a 0.25 in. auger, which was rotated by a small volume laboratory mixer to accuracies ±1 RPM. The auger functioned as a volumetric feeder, propelling cellulose from a gas-sealed acrylic hopper to the reactor. An unbalanced rotor vibrator was attached to the base of the hopper to ensure uniform and complete filling of the auger during operation, minimizing oscillation in fuel flow rates. Gases were fed through the hopper to the reactor using mass flow controllers operated by LabVIEW software accurate to ±0.05 SLPM. Water was supplied by an Isco syringe pump to a steam generator, where it was vaporized and fed via heated stainless steel tubing ~2 in. upstream of the catalyst bed. Steam was fed in close proximity to the catalyst in order to avoid water condensation on the reactor walls and cellulose conglomeration prior to contact with the catalyst. Reactor effluent was directed through a laboratory condenser to minimize throughput of condensable species, primarily water, to the sampling zone.

Temperature Measurement.

Experiments were primarily conducted with thermocouples placed at 10 mm and 30 mm from the front face of the catalyst bed. These thermocouples were inserted from the downstream side of the reactor tube during the placement of the foam monolith support.

Axial temperature profile experiments were conducted using a reactor tube with 16, 0.7 mm diameter holes placed in the quartz reactor tube along the length of the catalyst bed. Through these holes 16 K-type thermocouples were fed horizontally to the center of the catalyst bed as depicted in FIG. 9D. The quartz reactor tube was sealed using ultra high temperature ceramic adhesive. This apparatus facilitated the acquisition of steady state and transient reactor bed temperature profiles.

Reactor Operation.

Reactor start-up involved pre-heating an isolated portion of the catalyst to ~300° C. using an external heat source while passing methane and nitrogen gas through the reactor. Once hot, oxygen was added to the gas mixture at air stoichiometry and fuel-rich conditions necessary to avoid combustion stoichiometry. This procedure initiated the autothermal partial oxidation of methane in the catalyst bed, used to heat the reactor bed to ~900° C. Cellulose was then added to the reactor at ~30 g hour$^{-1}$. Flow of methane was discontinued, and the oxygen flow rate was adjusted to a fuel-rich (equivalence ratio<1.0) regime for experimental trials.

The reactor was insulated to minimize heat loss to the surroundings. In order to accurately determine cellulose flow rate to the reactor, the system was operated at low C/O in order to heavily oxidize any carbon before being exhausted from the sphere bed. The effluent was then analyzed to quantify carbon content (i.e. the CO and $CO_2$ were measured with gas chromatographer). Once a steady cellulose flow rate was observed, gases were adjusted to achieve the desired S/C, $N_2/O_2$, and C/O ratios, and the effluent was sampled. The system was then returned to a low C/O in order to verify the cellulose flow rate had not changed. This procedure was used for determining cellulose flow rate upon start-up, and for data obtained at operating conditions capable of producing condensable product species. The reactor was shut down by terminating cellulose, oxygen, and steam flows. Once the system was cooled, nitrogen flow was terminated.

All experiments without steam addition were operated at air stoichiometry ($N_2/O_2$=3.76). C/O is defined to be the molar ratio of carbon in the fuel to atomic oxygen fed as air. Complete cellulose combustion therefore occurs at C/O=0.5. Experiments were carried out at C/O ratios of 0.6, 0.7, 0.8, and 0.9. These experiments were run in oxygen deficient environments in order to maximize selectivity to synthesis gas and hydrogen. Cellulose flow rates of 25-60 g hour$^{-1}$ were used for all data collection.

Steam addition experiments were performed by incrementally replacing nitrogen with steam in increments of 20% of the gaseous feed to maintain a constant gaseous co-feed flow rate. Gas feed compositions considered were (in mole percents): 1) 60% $N_2$, 21% $O_2$, 19% $H_2O$, 2) 40% $N_2$, 21% $O_2$, 39% $H_2O$, 3) 20% $N_2$, 21% $O_2$, 59% $H_2O$, and 4) 00% $N_2$, 21% $O_2$, 79% $H_2O$. S/C is defined to be the molar ratio of steam to carbon in the fuel. Experiments were attempted at C/O ranging from 0.6 to 0.9, depending on whether autothermal operation was sustainable.

Catalyst Preparation.

All catalysts were prepared on Saint-Gobain Nor Pro Corporation 1.3 mm diameter α-$Al_2O_3$ spheres. The unmodified spheres have a surface area of 5.35 m$^2$ g$^{-1}$ and a packing density of 64.1 lbs ft$^{-3}$. Prior to Rh—Ce deposition, a γ-$Al_2O_3$ washcoat was added to the spheres to increase surface area via incipient wetness technique. A 5 wt % slurry of γ-$Al_2O_3$ in distilled water was added drop-wise to the spheres, which were then allowed to dry. Once dry, the spheres were calcined for 6 hours at 600° C. $Rh(NO_3)_3$ and $Ce(NO_3)_3.6H_2O$ metal salts were then added to the spheres also using the incipient wetness technique. A 1 wt % Rh and 1 wt % Ce slurry of metal salts in distilled water was added drop-wise to the spheres, which were then allowed to dry. Once dry, the spheres were calcined for 6 hours at 600° C. Catalysts were conditioned for ~1 hour under representative operating conditions before conducting experiments. Experiments were repeated on multiple catalysts with no measurable differences in activity. Catalysts were generally used for no less than 10 hours, during which there was no observable deactivation.

Feedstock Analysis.

Microcrystalline cellulose used in all experiments was obtained from FMC biopolymer. Samples of cellulose exposed to the air naturally absorbed ~5 wt % moisture (S/C~0.05). Moisture content was determined gravimetrically by drying in a vacuum oven. The particle size distribution was measured by light scattering. The raw cellulose sample was separated in No. 50 mesh sieve to obtain a sample with fewer particles smaller than 200 μm to increase ease of handling. Steam was produced from distilled water. The high purity gases, $N_2$ and $O_2$, were supplied separately with high pressure cylinders.

Product Analysis.

Gas samples were extracted with a syringe downstream of the laboratory condenser, and injected into a gas chromatograph. The system was calibrated to detect permanent gases and higher hydrocarbon species. Species response factors and column retention times were determined using known concentrations of premixed gases. During standard operation the carbon, oxygen, and hydrogen mass balances typically closed to within ±5%.

Experiments were conducted several times, typically repeated on several identical catalysts, with no significant differences observed between experiments. Catalyst operating temperature and time ranged from 550-1100° C. and 10-30 hours respectively. Selectivity to product species was calculated on an atomic carbon basis, $S_C$(species), or and atomic hydrogen basis, $S_H$(species). The selectivity was defined as (atoms in the product species)/(atoms in the converted fuel). Co-fed steam was not considered fuel. The sum of all selectivities to product species based on the same element (C or H) should equal unity within experimental error. The residence time was calculated as the void volume of the catalyst bed divided by the volumetric flow of effluent gases at the exit temperature. Sphere beds exhibit smaller void fractions resulting in faster residence times than foams.

Equilibrium Calculations.

Equilibrium calculations were performed by numerical minimization of Gibbs free energy using HSC Chemistry® software. Calculations were performed at 1 atm pressure and the temperature of the sphere bed 10 mm downstream of the front face ($T_{10}$). Back-face catalyst bed temperatures were not used due to significant temperature gradients, resulting from heat conduction to the monolith support. >99% conversion of fuel to $C_1$ products was expected at low S/C, facilitating the inclusion of the following species in the calculation: $CO_2$, CO, $CH_4$, $O_2$, $H_2$, $H_2O$. Process efficiency is defined as the flow availability of all products divided by the flow availability of all feed species.

TABLE 3

Selected experimental data for the millisecond reforming of microcrystalline cellulose.

| Experiment | 1 | 2 | 3 | 4 | 5 |
|---|---|---|---|---|---|
| Catalyst Bed Length (mm) | 30 | 30 | 30 | 30 | 60 |
| C/O Ratio | 0.9 | 0.9 | 0.8 | 0.8 | 0.9 |
| $H_2O$ Substitution For $N_2$ | 0 | 19 | 39 | 59 | 79 |
| S/C Ratio | 0.05 | 0.55 | 1.21 | 1.81 | 2.14 |
| $N_2/O_2$ Ratio | 3.76 | 2.86 | 1.91 | 0.95 | 0 |
| Mass Flow (g $hr^{-1}$) | 30 | 30 | 30 | 30 | 60 |
| Residence Time (ms) | 33 | 31 | 24 | 25 | 29 |
| Space Velocity (mol $hr^{-1}$ $L^{-1}$) | 118 | 118 | 118 | 118 | 118 |
| Mass Velocity ($hr^{-1}$) | 53 | 53 | 53 | 53 | 53 |
| H Selectivity (%) | | | | | |
| $H_2$ | 48 | 63 | 58 | 71 | 79 |
| $H_2O$ | 38 | 34 | 42 | 21 | 21 |
| C Selectivity (%) | | | | | |
| CO | 38 | 35 | 32 | 25 | 27 |
| $CO_2$ | 60 | 64 | 68 | 72 | 72 |
| $CH_4$ | 1.9 | 1.2 | 0.3 | 3 | 0.2 |
| Temperature at 30 mm (° C.) | 600 | 730 | 710 | 625 | 825 |
| $H_2$/CO | 1.1 | 1.4 | 1.5 | 3.0 | 2.3 |
| Syngas Dry Mole Fraction (%) | 18 | 24 | 22 | 25 | 42 |
| Process Efficiency (%) | 58 | 66 | 63 | 68 | 73 |

All experiments were considered on a bed of 1.3 mm $\alpha$-$Al_2O_3$ spheres with 5 wt % $\gamma$-$Al_2O_3$ washcoat and 5 wt % loading of Rh and Ce. The space velocity was defined as (molar flow of carbon)/(volume occupied by the catalytic spheres). The mass velocity was defined as the (mass flow of carbon)/(mass of RhCe). The process efficiency was defined in the text.

Results and Discussion

The results demonstrate that reforming of cellulose with steam addition can produce equilibrium selectivity to synthesis gas with very little selectivity to minor products. The syngas stoichiometry is tunable by adjusting the S/C ratio. Sustainable processing to a clean product stream maintains a significant fraction of the cellulose fuel value without observable formation of a solid carbon byproduct.

Autothermal Catalytic Partial Oxidation of Cellulose

Figure 9:
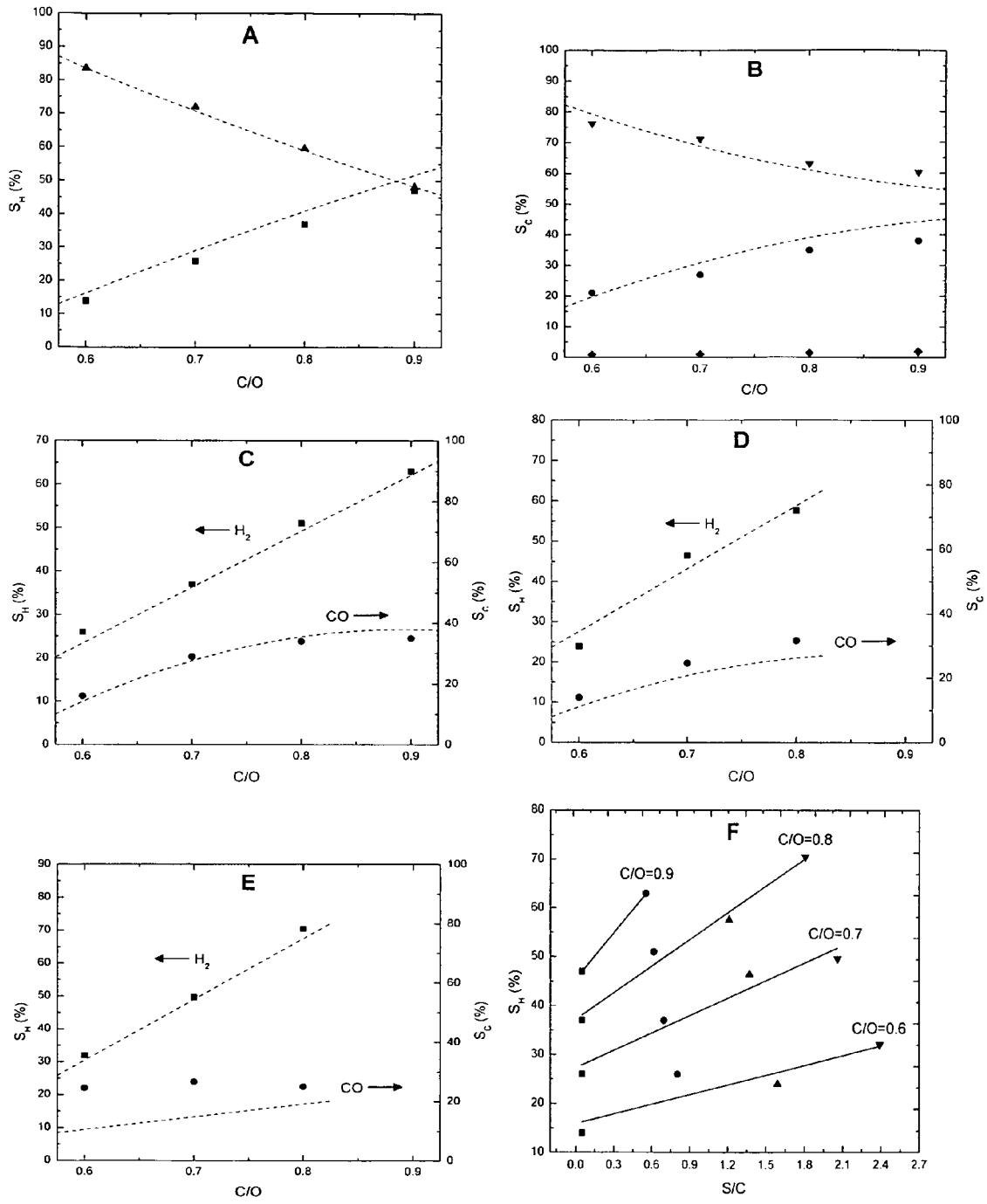
FIGS. 9A-F illustrates that the selectivity to hydrogen (■), water (▲), carbon monoxide (●), and carbon dioxide (▼) achieves equilibrium in the reforming of cellulose with gaseous co-feed: (79% $N_2$+21% $O_2$) in Panels A and B, co-feed (60% $N_2$+21% $O_2$+19% $H_2O$) in Panel C, co-feed (40% $N_2$+21% $O_2$+39% $H_2O$) in Panel D, co-feed (20% $N_2$+21% $O_2$+59% $H_2O$) in Panel E, and at 0≤S/C≤2.4 in Panel F. Dashed lines represent equilibrium concentrations and solid lines are fitted.

The production of gaseous products from the autothermal reforming of cellulose at S/C=0.05 (due to particle moisture) has been described in Panels A and B of FIG. 9. Steady operation was observed at all experimental conditions without oxygen breakthrough, and transient behavior due to a change in experimental operating conditions was resolved in 1-2 minutes. Carbon conversion to $C_1$ products is >99% for all C/O presented, and carbon selectivity to methane was <3% for all C/O, Selectivity to hydrogen ranges from a minimum of 14% at C/O=0.6, to a maximum of 47% at C/O=0.9. The majority of the remaining hydrogen atoms were converted to water. Selectivity to carbon monoxide ranges from a minimum of 21% at C/O=0.6, to a maximum of 38% at C/O=0.9. The majority of the remaining carbon atoms were converted to $CO_2$. For C/O<1.0 at S/C=0.05, experimentally measured selectivity to gaseous products achieved equilibrium within experimental error. Complete conversion was attainable at residence times less than 40 ms.

At C/O=1.0, production of organic species larger than $C_1$ was observed in the chromatogram. The incomplete decomposition to equilibrium products can be attributed to slower kinetics resulting from the decreased temperature at C/O=1.0. For all C/O, the coldest part of the catalyst bed ($T_{30}$) never dropped below 500° C. Overall performance with alumina spheres as a support for the Rh—Ce catalyst was very similar to that of 80 ppi alumina foams.

Panels C-E of FIG. 9 show selectivity to hydrogen and carbon monoxide as a function of C/O for the CPOx of cellulose at varying concentrations of $N_2$, $O_2$, and $H_2O$ feed gases. Steady operation was observed at all experimental conditions without oxygen breakthrough, and transient behavior due to a change in experimental operating conditions was resolved in 1-2 minutes. Carbon conversion to $C_1$ products is >99% for all C/O presented. Additionally, average methane selectivity with respect to carbon was <3% for all C/O. In Panel C, 19% molar substitution of nitrogen with steam raised the selectivity to $H_2$ to 63% while lowering selectivity to CO to 35% at C/O=0.9. When the substitution for nitrogen with steam was raised to 39% in Panel D, the overall operating temperature decreased, and the $C_2$ organic species were observed at C/O=0.90. However, at C/O=0.8, selectivity to $H_2$ was 58% and selectivity to CO was 32%. Further substitution of steam for nitrogen to 59% $H_2O$ gaseous feed further cooled the operating temperature of the reactor, but the addition of steam raised the observed selectivity of $H_2$ to 71% and lowered the selectivity to CO to 25% at C/O=0.8. Panel F of FIG. 9 relates the observed species to the operating S/C ratio for each of the experimental trials.

Process Chemistry

The process by which solid particles of cellulose ~315 µm in average diameter are reduced to $C_1$ products at millisecond time scales must account for particle volatilization in the presence of oxygen integrated with the catalytic partial oxidation of volatilized products on a noble metal surface. Each process, particle volatilization or catalytic reforming, consists of complex multi-phase chemical mechanisms and multiple modes of heat transfer for which the current understanding by computer modeling does not even extend to the individual process. The chemical and heat integration of the two processes expands the complexity of the overall reaction such that mechanistic observations are currently only available through effluent data and experiments considering more simple fuel species.

The impact of the cellulosic particle with the hot catalytic surface likely initiates the process chemistry. The magnitude of particle conversion occurring within the gaseous region 3-10 mm above the catalytic bed is likely limited, because previous examination has measured the gas-phase temperature of this region less than 300° C. severely limiting particle conversion by pyrolysis.

Particle volatilization is likely a complex convolution of heat transfer and reaction chemistry. Complete particle conversion must account for at least 1) the drying of the particle (~5 wt % moisture), 2) cellulose pyrolysis to gases (i.e. CO, $H_2$), volatile organics, and chars, 3) volatile organic cracking to gases, and 4) oxidation of gases, volatile organics, and chars. Multiple cellulose pyrolysis lumped kinetic models exhibit some form of competitive pathways to either gases (i.e. $H_2O$) and char, volatile organics (i.e. acetic acid, methanol), or just gases. Fluidized bed fast pyrolysis reactors maximize selectivity (~70 wt %) to volatile organics around 500° C. for ~1-2 seconds with millimeter-sized particles. Lower temperatures favor char production, while higher temperatures exhibit higher selectivity to gases with the lower kinetic limit for char production of ~3 wt % at 700-800° C.

Application of cellulose pyrolysis kinetics to spherical geometry to account for heat and mass transport has considered particle degradation in an inert atmosphere extensively. Under optimal fast pyrolysis conditions, organic particles as large as 1 mm usually exhibit heat transport control, while particles with diameters less than ~200 μm exhibit chemical kinetic control. The experiment considered here examines a related situation of direct impingement of a ~315 μm particle with a hot surface. One-dimensional transport/kinetic models considering solid cellulose rods contacting isothermal hot surfaces has shown superior selectivity to volatile organics due to higher particle heating rates. In an inert atmosphere with solid surface temperatures of 700-800° C., models predict cellulose pyrolysis of particles on the order of millimeters to exhibit selectivity to volatile organics as high as ~90 wt % and char less than 5 wt %.

The applicability of these simulations to the particle volatilization of the considered experiment depends greatly on the magnitude of oxidation chemistry occurring within the particle by interaction with the gaseous feed. The considered microcrystalline cellulose exhibits high porosity permitting an initial internal supply of oxygen. However, the evolution of gases and volatile organics that must be transported to the particle surface due to a difference in density must significantly hinder diffusion of oxygen into the particle. Alternatively, the oxidation of evolved species at the particle surface can only be elucidated through the consideration of a flow boundary layer as has been considered for particle combustion in a methane flame.

Evolved species from the solid particle likely mix with the bulk gas ($O_2+N_2+H_2O$) and flow into the fixed catalyst bed of Rh—Ce/γ-$Al_2O_3$/α-$Al_2O_3$ spheres. Likely devolatilized species include the same species observed in bio-oil samples that are derived from carbohydrate pyrolysis such as methanol, hydroxyacetaldehyde, acetic acid, or several furan-based compounds. Highly oxygenated species such as polyols (ethylene glycol and glyercol) have exhibited continuous, steady-state processing to synthesis gas with high conversion (>99%) and equilibrium selectivity to synthesis gas. Similar behavior has also been observed from the reforming of other species classes including esters and acids, ethers, and sugars. However, the role of competition existing within mixtures for surface chemistry is unknown, and limited research exists examining the catalytic partial oxidation of mixtures of organics.

The conversion of oxygenated species by catalytic partial oxidation is likely to occur by the general mechanism observed with methane reforming. Internal species measurements of methane have shown that conversion of fuel occurs in two distinct zones: oxidation and reforming. In the oxidation zone, volatile fuel species premixed with bulk gases enter the fixed-bed of catalyst spheres at high velocity and undergo exothermic surface oxidation chemistry. Greater than 99% of oxygen is consumed (by definition) within this region likely producing a significant fraction of the thermodynamic species ($H_2$, $H_2O$, $CO$, and $CO_2$) by surface chemistry. At low C/O ratios (more oxygen rich), the oxidation zone converts a large fraction of the fuel.

At higher C/O, a more significant fraction of fuel passes through the oxidation zone to the reforming zone. Endothermic surface chemistry between fuel and oxidation products such as $H_2O$ (steam reforming) or $CO_2$ (dry reforming) provide chemical routes to equilibrium. Additionally, the gas temperature is sufficiently high to permit endothermic cracking of fuel to smaller fuel species. Both of these chemistries are likely occurring simultaneously effectively lowering both the surface and gas phase temperature. The performance of the reforming zone ultimately determines the conversion of volatile fuel species. By selecting a sphere bed (small pores) with a γ-$Al_2O_3$ washcoat, the reactor is tuned in favor of the surface chemistries to the desired $C_1$ species. For high conversion of fuel, this zone must remain sufficiently hot to permit chemistries on the millisecond time scales. As C/O increases, less thermal energy is generated in the oxidation zone, and the endothermic chemistry of the reforming zone critically cools denying complete conversion of volatile organics. By this mechanism, volatile organics are initially produced at C/O≥1.0 for fuel flow rates of 25-40 g/hour on the considered fixed bed catalytic reactor (L=30 mm).

Catalyst deactivation can occur if the maximum in temperature observed at ~5 mm within the catalyst bed exceeds ~1200° C., permitting conversion of γ-$Al_2O_3$ to α-$Al_2O_3$ or sintering of Rh. This high temperature is accessible at any flow rate (25-60 g/hour) provided the C/O is low enough to generate sufficient heat. The third major process restriction is the ignition of solid particles above the catalyst which can propagate up the feed stream in an unsafe, unsustainable manner. The minimum ignition temperature of small (1 μm-1 mm) organic particles is a function of at least particle size and concentration, with smaller particles igniting at lower temperatures. The precise characteristics describing the ignition of particles approaching a hot surface can vary, however, sets of process parameters exist for which processing can occur without dilution with $N_2$ on particles as small as 300 μM have been demonstrated.

Process Performance

Using the knowledge gained from the experiments described in FIG. 9, experimental trials were executed to demonstrate the conversion of solid cellulose to an optimal synthesis gas stream. By selecting a fixed sphere-bed catalyst 6 cm in length and a process flow rate of 60 g/hour at a C/O=0.9 with steam addition of S/C=2.14 and 0% nitrogen addition, it was possible to completely convert cellulose to a synthesis gas rich stream with a synthesis gas ratio of $H_2/CO=2.3$ comprising a dry mole fraction of 42%. Under these conditions, reactor exhibited steady autothermal reforming with no oxygen breakthrough at a gaseous residence time less than 30 ms. Additionally, ~80% of the atomic hydrogen provided by the feedstock cellulose was converted to molecular $H_2$.

Analysis of the conversion from a solid fuel to a gaseous fuel must account for the loss in fuel value. Using the method described above, the maximum theoretical work that could be achieved from the feedstock cellulose (availability) was ~18 MJ/kg. By millisecond reforming, nearly ~75% of this potential was maintained as the gaseous effluent in the optimal experiment (trial 5) of Table 3. Most of the retained fuel availability existed within the synthesis gas (75-80%) with the remaining fraction occurring with the high temperature (600-800° C.) steam, carbon dioxide or nitrogen. The loss in ~25% of the fuel value of cellulose can be attributed process irreversibilities such as the generation of a large number of moles from cellulose. The primary benefit offsetting the one quarter loss in fuel value is an improvement in ease of fuel handling. Relative to gases, the transportation of solids within a chemical process remains a demanding, energy intensive technique requiring significant maintenance.

Comparison of the autothermal steam reforming of cellulose with other catalytic gasification techniques will ultimately determine the benefit of small, fast chemistry. While a complete process design and economic analysis is ultimately the best technique for determining the optimal process, an analysis of the operation of the gasification reactor provides an alternative metric that can be realistically assessed within this report. The carbon space velocity has been defined as the ratio of the molar flow rate of biomass carbon to the volume necessary for reaction chemistry. By this definition, higher carbon space velocities result in smaller reactors. The carbon mass velocity has been defined as the ratio of the mass flow of biomass carbon to the mass of catalyst such that higher mass velocities result in lower use of catalyst. In general, millisecond reactors are at least an order of magnitude smaller and use less catalyst than most conventional catalytic gasification schemes. See Dauenhauer et al., *Angew. Chem. Int. Ed.* 2007, 46, 5864-5867, which is incorporated herein by reference.

Conclusions

The three sets of chemistries necessary for the biomass-to-liquids process (volatilization of cellulose, tar cleaning of organic compounds, and the water-gas-shift of the gaseous effluent) can be integrated into one continuous flow catalytic reactor by reactive flash volatilization. Complete conversion of microcrystalline cellulose particles (~300 μm) to only $C_1$ products can occur faster than 30 milliseconds with the use of RhCe/γ-$Al_2O_3$ catalysts over a wide range of S/C, C/O, and $N_2/O_2$. Steady, autothermal reforming without the presence of a diluent such as $N_2$ produces a more synthesis gas rich effluent. Additionally, the effluent synthesis gas ratio is tunable (1.0<$H_2$/CO<3.0) by manipulating the S/C of the reactor feed.

The process appears to occur by the thermal integration of endothermic particle volatilization driven by heat conducted from an exothermic oxidation zone within the catalyst bed. Sufficient heat transfer from the oxidation zone to the entire fixed catalytic bed is thought to maintain the temperature above that at which coke is predicted by equilibrium. By this method, optimal processing conditions permit conversion such that ~75% of the fuel value of the cellulose is maintained in the synthesis gas effluent.

CITED DOCUMENTS

[1] Arthur. J. Ragauskas, et. al., *Science* 311 (2006) 484.
[2] A. V. Bridgwater, *Chem. Eng. J.* 91 (2003) 87.
[3] Ciferno, J. P., Marano, J., 2002: *Benchmarking Biomass Gasification Technologies for Fuels, Chemicals and Hydrogen Production*. National Energy Technology Labs U.S. Department of Energy, Pittsburgh, Pa.
[4] J. R. Rostrup-Nielsen, *Science* 308 (2005) 1421-1422.
[5] A. G. W. Bradbury, Y. Sakai, F. Shafizadeh, "A Kinetic Model for Pyrolysis of Cellulose," *J. Applied Polymer Science* 23 (1979) 3271-3280.
[6] A. Broido et al., *Thermal Uses and Properties of Carbohydrates and Lignins*, Academic Press: New York, 1976.
[7] D. S. Scott, J. Piskorz, M. A. Bergougnou, R. Graham, R. P. Overend, "The Role of Temperature in the Fast Pyrolysis of Cellulose and Wood," *Ind. Eng. Chem. Res.* 27 (1988) 8-15.
[8] M. Asadullah et al., "A novel catalytic process for cellulose gasification to synthesis gas," *Catalysis Communications* 2 (2001) 63-68.
[9] Di Blasi, C., "The state of the art of transport models for charring solid degradation," *Polymer International* 49 (2000) 1133-1146.
[10] Di Blasi, C., *Chemical Engineering Science* 51 (10) (1996) 2211.
[11] M. Heitz et al., "Fractionation of *Populus tremuloides* at the Pilot Plant Scale Optimization of Steam Pretreatment Conditions using the STAKE II Technology," Bioresource Technology 35 (1991) 23.
[12] Misra et al., "Wood Ash Composition as a Function of Furnace Temperature," Biomass and Bioenergy 4 (1993) 103-116.
[13] P. J. Dauenhauer, J. R. Salge, L. D. Schmidt, "Renewable hydrogen by autothermal steam reforming of volatile carbohydrates," *Journal of Catalysis* 244 (2006) 238-247.
[14] H. Sinn, W. Kaminsky, J. Janning, *Angew. Chem.* 88 (1976) 737.
[15] W. Kaminsky, M. Predel, A. Sadiki, Polymer Degradation and Stability 85 (2004) 1045-1050.
[16] M. J. Moran, *Availability Analysis: A Guide to Efficient Energy Use*, ASME Press: New York, 1989.
[17] Jess et al., "Diesel Oil from Natural Gas by Fischer-Tropsh Synthesis Using Nitrogen-Rich Syngas," *Chem. Eng. Technol.* 24 (2001) 27.
[18] J. R. Rostrup-Nielsen, "New aspects of syngas production and use," *Catalysis Today* 63 (2000) 159-164.
[19] Dauenhauer, Dreyer, Degenstein, Schmidt, "Millisecond Reforming of Solid Biomass for Sustainable Fuels," *Angew. Chem. Int. Ed.* 46 (2007) 5864-5867.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method comprising:
   contacting a carbon and hydrogen-containing solid fuel and a metal-based catalyst in a fixed bed reactor in the presence of oxygen gas to produce hydrogen gas and carbon monoxide gas, wherein the contacting occurs at a temperature sufficiently high to prevent char formation in an amount capable of stopping production of the hydrogen gas and carbon monoxide gas.

2. The method of claim 1 wherein the metal-based catalyst contains a transition metal or noble metal, in combination with a lanthanide.

3. The method of claim 2 wherein the metal-based catalyst comprises Ni, Pd, Pt, Co, Rh, Ir, Fe, Ru, Os, Cu, Ag, Au, Re, or a combination thereof.

4. The method of claim 2 wherein the lanthanide is cerium or lanthanum.

5. The method of claim 4 wherein the metal-based catalyst is a rhodium-cerium catalyst.

6. The method of claim 1 wherein the carbon and hydrogen-containing solid fuel is non-fossilized biomass.

7. The method of claim 1 wherein the carbon and hydrogen-containing solid fuel comprises fossilized biomass.

8. The method of claim 1 wherein the contacting occurs in the presence of added oxygen and optionally nitrogen.

9. The method of claim 8 wherein methane gas is also present when contacting begins; wherein the methane gas is optionally used to preheat the catalyst.

10. The method of claim 1 wherein carbon and oxygen are present in a ratio of between about 0.3:1 and about 2.5:1.

11. The method of claim 1 wherein the temperature is at least about 400° C.

12. The method of claim 10 wherein the fuel is contacted with a surface of the metal-based catalyst at a rate sufficient to maintain the surface temperature of the catalyst between about 500° C. and about 1600° C.

13. The method of claim 1 wherein total residence time of the hydrogen gas and the carbon monoxide gas is less than about 500 milliseconds.

14. The method of claim 1 wherein total residence time of the hydrogen gas and the carbon monoxide gas is less than about 80 milliseconds.

15. The method of claim 1 further comprising mechanically removing ash from the leading face of the metal-based catalyst.

16. The method of claim 1 further comprising providing water vapor or steam to the oxygen gas, wherein the steam-to-carbon ratio is about 0.01:1 to about 10:1.

17. The method of claim 1 further comprising diluting the oxygen gas with a diluent gas, wherein the diluent gas comprises nitrogen gas, helium, argon, or a combination thereof.

18. A method for producing synthesis gas, the method comprising:

inputting carbohydrate-based solid fuel particles into a reactor, wherein the reactor contains a metal-lanthanide catalyst in a fixed bed;

inputting nitrogen and oxygen into the solid fuel source and the reactor at about room temperature, wherein carbon and oxygen are input in a ratio of between about 0.3 to about 2.5; and allowing the particles to contact a front surface of the catalyst wherein synthesis gas is produced at a total gas residence time of less than about 500 seconds milliseconds without an external heating system.

19. The method of claim 18 wherein the solid fuel particles comprise starch, cellulose, hemicellulose, lignin, or a combination thereof.

a feed system for feeding solid biomass into the reactor at a controlled solids feed rate; and means for inputting nitrogen and oxygen into the reactor to provide for a carbon to oxygen ratio of between about 0.3 and 2.5, wherein the solid biomass contacts a surface of the metal-based catalyst to produce synthesis gas.

* * * * *

UNITED STATES PATENT AND TRADEMARK OFFICE
CERTIFICATE OF CORRECTION

Page 1 of 1

PATENT NO. : 8,790,546 B2
APPLICATION NO. : 12/528416
DATED : July 29, 2014
INVENTOR(S) : Schmidt et al.

It is certified that error appears in the above-identified patent and that said Letters Patent is hereby corrected as shown below:

On the title page, in column 2, item [56] under "Other Publications", line 2, delete "Catgalysis Communicatinos" and insert --Catalysis Communications--, therefor On title page 2, in column 1, item [56] under "Other Publications", line 1, delete "gadification" and insert --gasification--, therefor On title page 2, in column 1, item [56] under "Other Publications", line 8, delete "flied" and insert --filed--, therefor In the Specification Column 3, line 26, delete "$C_1$" and insert --$CH_4$--, therefor Column 7, line 27, delete "FIG.11n" and insert --FIG. 1. In--, therefor Column 17, line 38, after "moving", insert --catalytic bed by the continuous slow removal and addition of catalytic spheres.--, therefor In the Claims Column 30, line 10, Claim 18, after "500", delete "seconds", therefor Column 30, line 15-20, Claim 19, after "thereof.", delete "a feed system for feeding solid biomass into the reactor at a controlled solids feed rate; and
means for inputting nitrogen and oxygen into the reactor to provide for a carbon to oxygen ratio of between about 0.3 and 2.5, wherein the solid biomass contacts a surface of the metal-based catalyst to produce synthesis gas.", therefor Signed and Sealed this
Twenty-fifth Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,790,546 B2
APPLICATION NO.   : 12/528416
DATED             : July 29, 2014
INVENTOR(S)       : Schmidt et al.

Page 1 of 1

It is certified that error appears in the above-identified patent and that said Letters Patent is hereby corrected as shown below:

In the specification

Column 1, line 6-9, delete "This invention was made with government support under Grant Number DE-FG02-88ER13878 from the U.S. Department of Energy. The United States Government has certain rights in the invention." and insert --This invention was made with government support under DE-FG02-88ER13878 awarded by the Dept. of Energy. The government has certain rights in the invention.--, therefor Signed and Sealed this
Thirteenth Day of October, 2015

Michelle K. Lee
*Director of the United States Patent and Trademark Office*